(12) United States Patent
Cooke

(10) Patent No.: US 9,944,347 B2
(45) Date of Patent: Apr. 17, 2018

(54) PIVOTING CHAINRING ASSEMBLY

(71) Applicant: SRAM, LLC, Chicago, IL (US)

(72) Inventor: James Cooke, Temecula, CA (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 15/216,405

(22) Filed: Jul. 21, 2016

(65) Prior Publication Data

US 2018/0022414 A1 Jan. 25, 2018

(51) Int. Cl.
  *B62M 3/00* (2006.01)
  *B62M 1/36* (2013.01)
  *B62M 9/12* (2006.01)

(52) U.S. Cl.
  CPC ............... *B62M 1/36* (2013.01); *B62M 3/00* (2013.01); *B62M 9/12* (2013.01)

(58) Field of Classification Search
  CPC . B62M 1/36; B62M 1/38; B62M 3/00; B62M 3/003; B62M 3/06; B62M 9/04; B62M 9/12; B62M 9/121; B62M 11/145
  See application file for complete search history.

(56) References Cited

U.S. PATENT DOCUMENTS

| | | | |
|---|---|---|---|
| 5,911,792 A | 6/1999 | Jaimes | |
| 6,173,982 B1 | 1/2001 | Westergard | |
| 7,708,295 B2 * | 5/2010 | Wesling | B62K 19/34 280/260 |
| 8,707,824 B2 * | 4/2014 | Benkert | B62M 3/003 74/594.2 |
| 9,103,392 B2 * | 8/2015 | Steuer | F16D 41/26 |
| 9,469,371 B2 * | 10/2016 | Edwards | B62M 3/00 |
| 2009/0045600 A1 * | 2/2009 | Garnier | B62M 3/003 280/281.1 |
| 2013/0008282 A1 | 1/2013 | Johnson | |
| 2015/0274253 A1 | 10/2015 | Hara | |
| 2016/0272276 A1 * | 9/2016 | Ferreira Marinho | B62M 1/30 |

FOREIGN PATENT DOCUMENTS

| | | |
|---|---|---|
| DE | 3141296 | 4/1983 |
| DE | 3838359 | 5/1990 |
| DE | 4129198 | 3/1993 |
| DE | 202009013652 U1 | 1/2010 |
| FR | 2527543 | 12/1983 |
| FR | 2881199 | 7/2006 |
| WO | 1995013209 | 5/1995 |

* cited by examiner

*Primary Examiner* — Adam D Rogers

(57) ABSTRACT

A pivotable chainring assembly for a bicycle includes a chainring and a carrier. The carrier includes an annular bearing and a pivot attachment portion. The annular bearing includes an inner race and an outer race. The outer race of the annular bearing is rotatable about a crank axis. The chainring is physically connected to and rotatably fixed relative to the outer race of the annular bearing. The inner race of the annular bearing is physically connected to and rotationally fixed relative to the pivot attachment portion. The pivot attachment portion has a pivot axis disposed a distance from the crank axis. The chainring is rotatable about the crank axis and rotatable about the pivot axis.

27 Claims, 17 Drawing Sheets

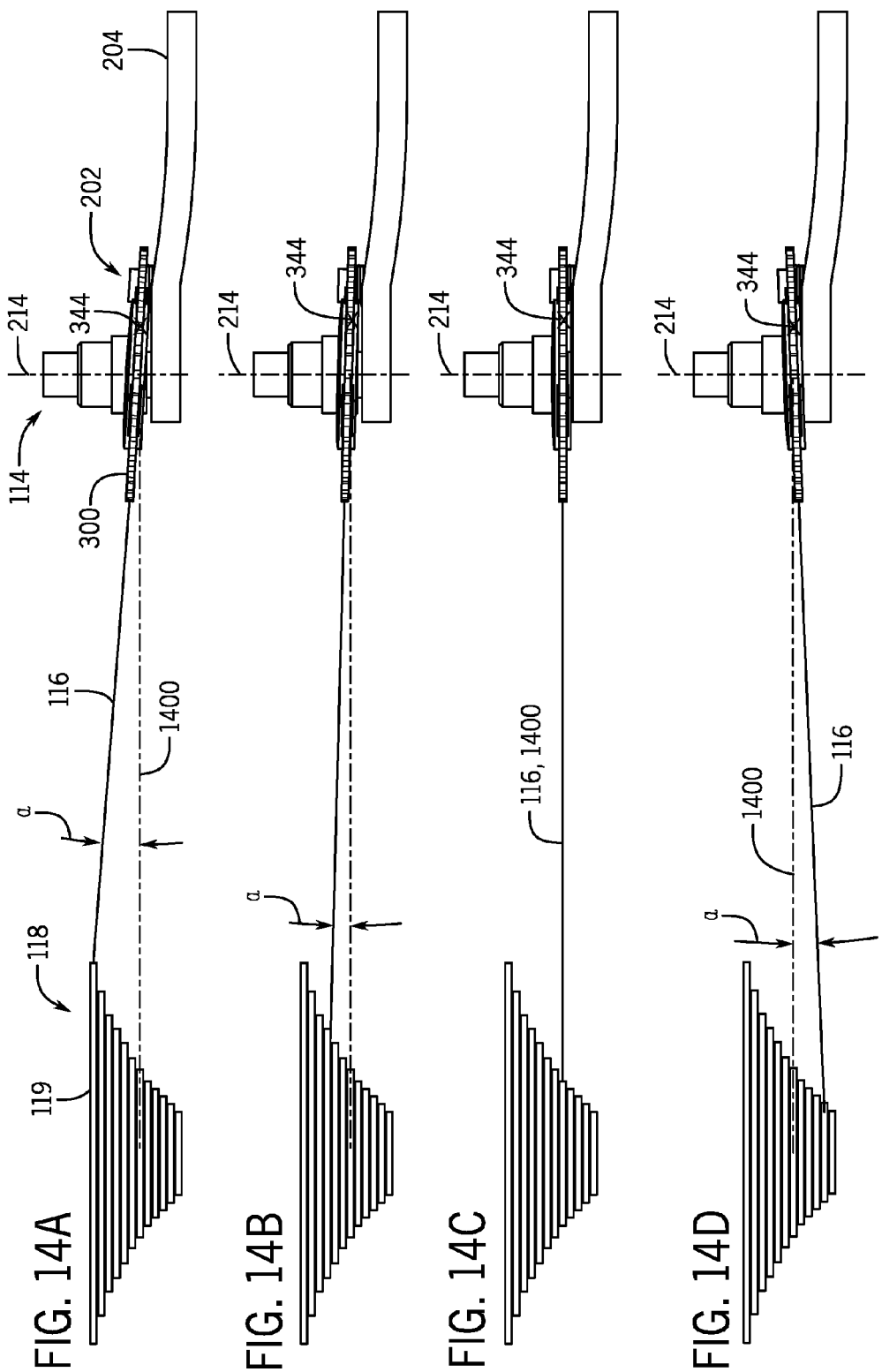

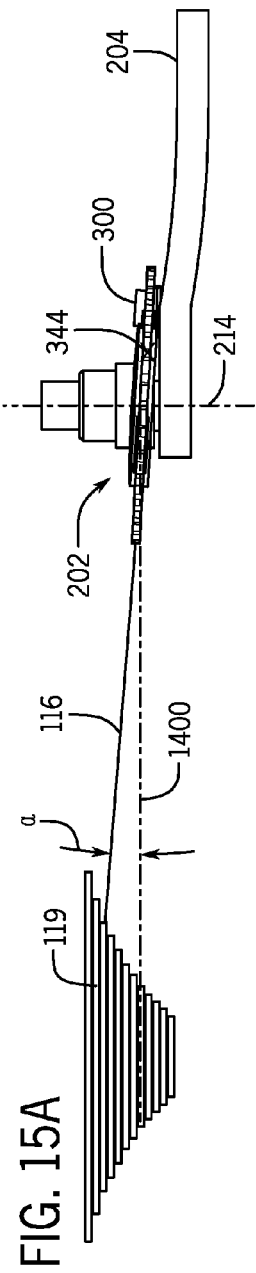
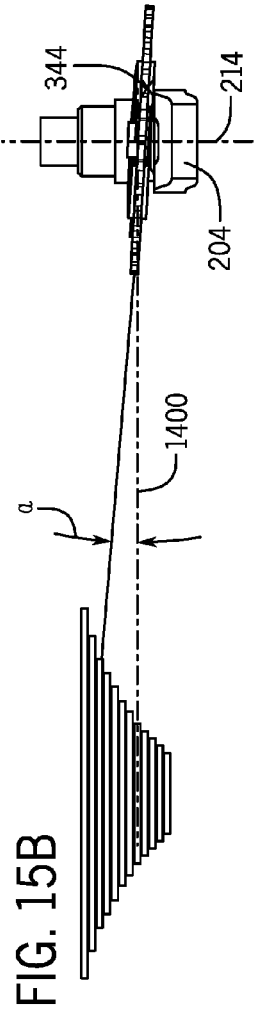
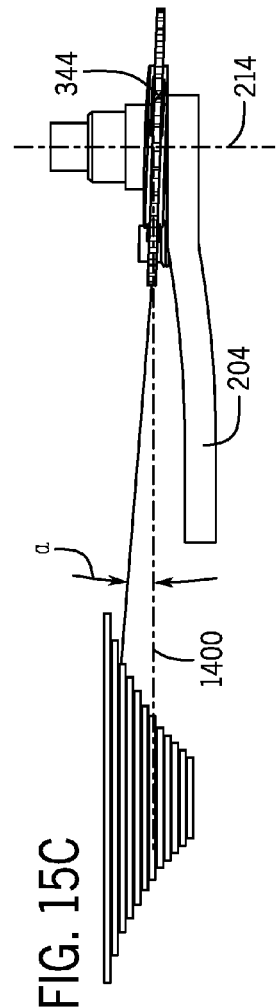

PIVOTING CHAINRING ASSEMBLY

BACKGROUND

1. Field of the Disclosure

This application is generally related to a crankset for at least partially human powered vehicles, and more particularly to a tiltable, or pivotable, chainring assembly for same.

2. Description of Related Art

Drivetrain systems are well known for use on two-wheeled vehicles. Some drivetrain systems are also known for use specifically on bicycles. The drivetrain system for a bicycle is used to transmit power from a rider to at least one wheel of the bicycle. For example, the drivetrain system may be used by the rider to transmit power to a rear wheel of the bicycle. The typical drivetrain system for a multi-geared bicycle includes a crank assembly including two crank arms having pedals, respectively, a crankshaft connecting the two crank arms, at least one chainring, a cassette including a number of sprockets, a chain connecting the at least one chainring to the cassette, and at least one derailleur. For example, the drivetrain system includes a single chainring and a rear derailleur. The rear derailleur is remotely operated electronically, hydraulically, or by a Bowden cable connected to a shifter on a part of the bicycle to move the chain from one sprocket to another sprocket within the cassette. The sprockets within the cassette have different diameters, and thus, each of the sprockets within the cassette provides a different gear ratio for the bicycle.

Over time, the number of sprockets included in the cassette and the width of the cassette has increased. For example, the cassette may include ten, eleven, or twelve sprockets. The chainring may be in line (e.g., coplanar) with only one sprocket of the cassette. A chainline, which may be defined as a line of the chain connecting the chainring and an engaged rear sprocket, may thus be straight for only the one sprocket that is coplanar with the chainring. All other sprockets of the cassette are offset relative to the chainring, and the corresponding chainlines extend at angles relative to the straight chainline, respectively. Angled chainlines, and mores specifically severely angled chainlines (e.g., produced with an outermost sprockets within the cassette), increases chain wear, chainring wear, sprocket wear, and increases side load stress on the chain, the chainring, and the sprocket. Angled chainlines also reduce efficiency in converting power from the rider to, for example, the rear wheel of the bicycle. This becomes more of an issue as the angle of the chainline relative to the straight chainline increases with wider cassettes (e.g., caused by an increased number of sprockets within the cassette and/or the widths of the sprockets within the cassette).

Existing solutions have been devised to decrease wear and side load stress on the chain, the chainring, and the sprockets of the cassette. One such solution has been to allow the chainring to move side to side, axially, along the crankshaft. However, movement of the chainring along the crankshaft may require a large axial force due to the drive load, and often the chainring does not experience a large enough axial force to move along the crankshaft to align with the selected sprocket. Also, to align with all of the sprockets of the cassette, the chainring would need to move along the crankshaft the same side-to-side distance as the width of the cassette. These attempted solutions thus result in significantly higher manufacturing and part costs. As a result, such solutions have not been suitable for most two-wheeled vehicle markets or consumers.

SUMMARY

In one example according to the teachings of the present disclosure, a carrier for a chainring of a bicycle is provided. The chainring includes a chainring attachment portion, a crank assembly attachment portion, and a pivot attachment portion. The chainring attachment portion and the crank assembly portion are configured to rotate about a crank axis and transmit torque between the crank assembly attachment portion and the chainring attachment portion. The pivot attachment portion has a pivot axis disposed a distance from the crank axis. The chainring attachment portion and the crank assembly attachment portion are configured to rotate about the pivot axis and the crank axis.

In one example, the pivot attachment portion does not rotate about the crank axis.

In one example, the carrier further includes a friction reducing device disposed between the pivot attachment portion and the chainring attachment portion. The friction reducing device reduces friction of rotational motion therebetween.

In one example, the friction reducing device is an annular bearing having an inner race and an outer race.

In one example, the inner race of the annular bearing is rotationally fixed relative to the pivot attachment portion.

In one example, the pivot attachment portion is formed as part of the inner race of the annular bearing.

In one example, the pivot attachment portion and inner race of the annular bearing are formed as an integral single piece structure.

In one example, the pivot axis is perpendicular to the crank axis.

In one example, the pivot axis is disposed a distance farther from a rear wheel axis of the bicycle than the crank axis is disposed from the rear wheel axis.

In one example, the crank assembly attachment portion is configured for attachment to a crank arm of a crank assembly.

In one example, the crank assembly attachment portion includes a sliding surface. The surface is configured to slidably attach the carrier to a corresponding feature of the crank arm.

In one example, the sliding surface is disposed a radial distance from the crank axis.

In one example, the carrier further includes a rotation resistance device configured to resist the rotation of the carrier about the pivot axis.

In one example, the rotation resistance device includes a detent mechanism.

In one example, the detent mechanism includes a plurality of preset detent positions corresponding to a plurality of pivot positions of the carrier about the pivot axis.

In one example according to the teachings of the present disclosure, a crankset for a bicycle is provided. The crankset includes a crank assembly including a first crank arm, a second crank arm, and a crankshaft connecting the first crank arm and the second crank arm when the crankset is assembled. The crankset also includes a chainring assembly including a chainring and a carrier. The chainring includes a plurality of teeth disposed about a periphery of a body of the chainring. The chainring has an opening through which the crankshaft extends. The chainring is configured to rotate about a crank axis. The carrier includes a pivot having a pivot axis. The chainring is rotatably attached to the carrier about the crank axis such that the chainring is also configured to rotate about the pivot axis. The pivot axis is at a distance removed from the crank axis.

In one example, the pivot axis is disposed perpendicular relative to the crank axis.

In one example, the carrier further includes an annular bearing. The annular bearing includes an inner race and an outer race. The chainring includes a connection region radially inner of the plurality of teeth. The carrier further includes a radially outer connection portion fixably connected to the outer race. The radially outer connection portion is configured to mount to the connection region of the chainring. The carrier further includes a radially inner pivot mounting portion fixably attached to the inner race. The radially inner pivot mount portion is configured to attach to a rotatably fixed portion of the bicycle and rotate about the pivot axis.

In one example, the radially inner pivot mounting portion includes a ring having an outer annular surface that is connected to the inner race of the annular bearing. The radially inner pivot mounting portion is tiltable relative to the rotatably fixed portion of the bicycle about the pivot axis.

In one example, the pivot includes a pin that couples the radially inner pivot mounting portion with the rotatably fixed portion of the bicycle. The pin extends through openings through the rotatably fixed portion of the bicycle and the radially inner pivot mounting portion, respectively, and defines the pivot axis.

In one example, the crankshaft extends through the rotatably fixed portion of the bicycle and is rotatable relative to the rotatably fixed portion of the bicycle.

In one example, the radially inner pivot mounting portion includes a rotational resistance device extending radially inward of an inner surface of the radially inner pivot mounting portion. The rotatably fixed portion of the bicycle includes at least one outer wall. The at least one outer wall interacts with the rotational resistance device to resist rotation of the carrier about the pivot axis.

In one example, the at least one outer wall of the rotatably fixed portion of the bicycle has a plurality of indentations into which the rotational resistance device is positionable. Each indentation of the plurality of indentations corresponds to a different tilt angle of the carrier and the chainring relative to the rotatably fixed portion of the bicycle.

In one example, the rotational resistance device is a detent device.

In one example, the first crank arm is connected to and drives the carrier at a radial distance removed from a radially outer surface of the crankshaft.

In one example, the first crank arm is connected to the carrier with a linear motion bearing.

In one example according to the teachings of the present disclosure, a chainring assembly for a bicycle is provided. The chain ring assembly includes a chainring including a plurality of teeth disposed about a periphery of a body of the chainring. The chainring is configured to rotate about a crank axis. The chain ring assembly also includes a carrier. The carrier includes a chainring attachment portion, a crank assembly attachment portion, and a pivot attachment portion. The chainring attachment portion and the crank assembly attachment portion are configured to rotate about a crank axis and transmit torque between the crank assembly attachment portion and the chainring attachment portion. The pivot attachment portion has a pivot axis disposed a distance from the crank axis. The chainring attachment portion and the crank assembly attachment portion are configured to rotate about the pivot axis and the crank axis.

BRIEF DESCRIPTION OF THE DRAWINGS

Objects, features, and advantages of the present invention will become apparent upon reading the following description in conjunction with the drawing figures, in which:

FIGS. 14A-14D show different tilt angles of a portion of a chainring assembly for a single position of a crank of the crankset of FIG. 2.

FIGS. 15A-15C show a single tilt angle of a portion of a chainring assembly for a number of different positions of a crank of the crankset of FIG. 2.

DETAILED DESCRIPTION OF THE DISCLOSURE

Figure 1:
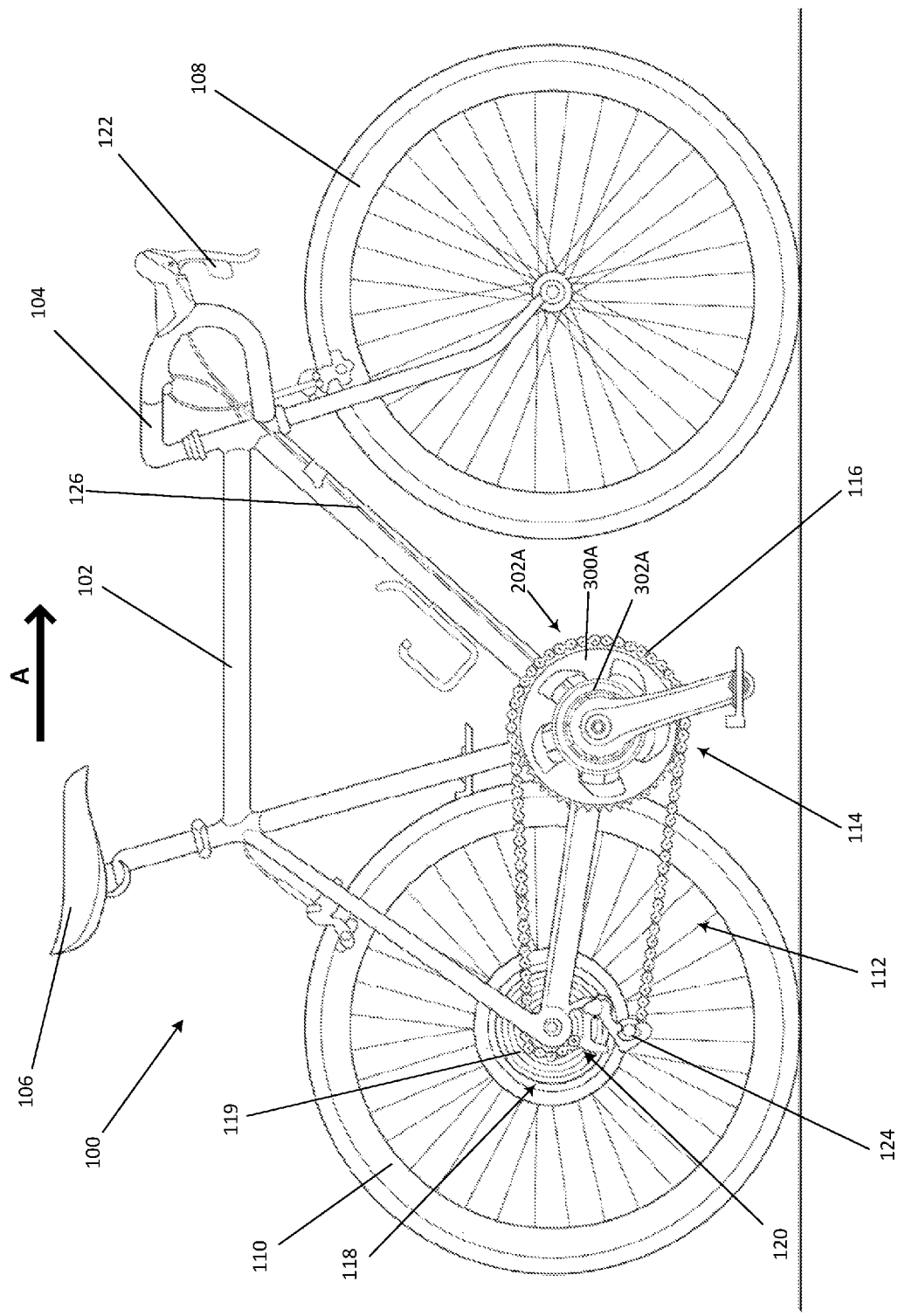
FIG. 1 shows a side elevational view of one example of a bicycle, which may be fitted with a crankset in accordance with the teachings of this disclosure.

The tiltable chainring assemblies disclosed and described herein solve or improve upon one or more of the above-noted and/or other problems and disadvantages with prior known drivetrain system designs. The disclosed tiltable chainring assemblies may reduce chain, chainring, and sprocket wear, and may reduce side load stress on the chain, the chainring, and the sprockets within the cassette compared to the prior art drivetrain systems. The disclosed tiltable chainring assemblies may reduce frictional power loss due to chain misalignment. The disclosed tiltable chainring assemblies may also increase chain retention and aid in the elimination of cassette sprocket drop/derail during back pedaling. The disclosed tiltable chainring assemblies may self-align with a number of different cassette sprockets, as a chain angle for a chain driven by the tiltable chainring assembly varies based on the cassette sprocket selected; no outside activation is required for the varied chain angle. The disclosed chainring assemblies, as a result, produce less noise compared to drivetrain systems of the prior art.

Cranksets including a chainring (e.g., a drive sprocket) that tilts or pivots about a pivot axis at a distance removed from a rotation axis of the chainring are disclosed herein.

The crankset includes one or more crank arms connected with a crankshaft, a chainring, a carrier including a bearing, and a bottom bracket mount. The bottom bracket mount is fixedly held in a frame of a bicycle and does not rotate in relation to the frame of the bicycle. A pivot extends through the bottom bracket mount and a portion of the carrier. The pivot allows the carrier to tilt about the pivot axis in relation to the bottom bracket mount. The chainring is disposed on the bearing or other rotation facilitation device of the carrier, thus allowing the chainring to rotate about the pivot axis. The crankshaft extends through the bottom bracket mount and is rotatable therein. A crank arm includes a drive pin that is received in a sleeve on the chainring. The drive pin transfers force applied to the crank arm to the chainring and/or carrier such that the chainring rotates about the rotation axis. A bearing on the drive pin may allow the drive pin to shift within the sleeve on the chainring as the chainring is rotated during rotation of the crank arm.

A spring detent may be used to locate a pivoted position of the chainring at predetermined angles, which prevents wobbling during rotation of the chainring. The wobbling is due to changing force vectors as a crank arm contact drives the chainring during rotation of the chainring, and is greatest when the chainring is pivoted, in either direction, from perpendicular to the crankshaft.

A location of the pivot axis offset from the rotation axis of the chainring aids in the function of self-aligning. Increasing an offset distance (e.g., the trail) may improve the self-aligning feature. The pivot axis may be located forward of the chainring, on an opposite side of the chainring as the cassette.

A location of a drive point in the 360 degrees of rotation of the chainring about the axis of rotation of the chainring is at a radial outer distance from the axis of rotation of the chainring due to a varying location of power application (e.g., a power stroke) during pedaling of the bicycle. The location in rotation that the power is applied to the chainring has an affect on stability of the chainring. This is more evident when the chainring is pivoted in either direction from a location perpendicular to the crankshaft.

Turning now to the figures, FIG. 1 illustrates one example of a two-wheeled vehicle on which the disclosed cranksets may be implemented. In this example, the two-wheeled vehicle is one possible type of bicycle 100, such as a light-weight road bicycle. The bicycle 100 has a frame 102, handlebars 104 near a front end of the frame 102, and a seat 106 for supporting a rider over a top of the frame 102. The bicycle 100 also has a first or front wheel 108 supporting the front end of the frame 102 and a second or rear wheel 110 supporting a rear end of the frame 102. The bicycle 100 also has a drive train 112 with a crankset 114 that is operatively coupled via a chain 116 to a rear cassette 118 near a rotation axis of the rear wheel 110. The rear cassette 118 includes a number of sprockets or cogs 119 (e.g., twelve sprockets) that provide different gear ratios. The front and/or forward orientation of the bicycle 100 is indicated by the direction of arrow "A." As such, a forward direction of movement for the bicycle as caused by the drivetrain 112 is indicated by the direction of arrow A.

While the bicycle 100 depicted in FIG. 1 is a road bicycle, the crankset embodiments and examples disclosed herein may be implemented on other types of bicycles such as, for example, mountain bicycles, as well as bicycles with mechanical (e.g., cable, hydraulic, pneumatic, etc.) drive systems.

In the illustrated embodiment, the drive train 112 includes a gear shifting system 120. The gear shifting system 120 includes a first gear control lever assembly 122 disposed on the handlebars 104, a first derailleur 124, and a first cable 126. The first gear control lever assembly 122, the first derailleur 124, and the first cable 126 are used to move the chain 116 from one sprocket 119 to another sprocket 119 within the rear cassette 118. In one example, the gear shifting system 120 also includes a second gear control lever assembly (e.g., to control drive sprocket selection), also disposed on the handlebars 104, a second derailleur, and a second cable. The first gear control lever assembly 122 is connected to the first derailleur 124 via the first cable 126. The first cable 126 may be a Bowden cable and may be made of any number of materials including, for example, stainless-steel. In other embodiments, the gear shifting system 120 may include one or more additional and/or alternative components and/or may be configured in other ways. Additionally, the gear shifting system 120 may be replaced by a different type of gear shifting system, such as a non-mechanical gear shifting system utilizing electronic or wireless components.

When the rider of the bicycle 100 operates the first gear control lever assembly 122 during operation of the bicycle 100, a change in tension in the first cable 126 moves a chain guide of the first derailleur 124 from side-to-side, allowing selection of the different sprockets 119. The chain 116 is straight for only one of the sprockets 119 of the rear cassette 118. In other words, a drive sprocket 128 of the crankset 114 is coplanar with only one of the sprockets 119 of the rear cassette 118. The other sprockets 119 are offset different distances from the drive sprocket 128. When the rider moves through the different sprockets 119 of the rear cassette 118 using the gear shifting system 120, the chain 116 bends due to the respective offset distances. The sprockets 119 of the rear cassette 118 furthest away from the coplanar sprocket 119 produce the most bending of the chain 116, and thus the most chain, drive sprocket, and rear cassette sprocket wear, and side load stress on the chain, the drive sprocket, and the rear cassette sprockets.

In the illustrated embodiment, the crank assembly or crankset 114 includes a chainring assembly 202A. The chainring assembly 202A includes a chainring 300A and a carrier 302A. The carrier 302 is configured to allow the tilting and/or pivoting of the chainring 300A about a pivot axis as well as the rotation of the chainring 300A about a crank axis. This facilitates at least a partial alignment of the chainring 300A with the chain as it is moved and operates on the different rear sprockets 119.

Figure 2:
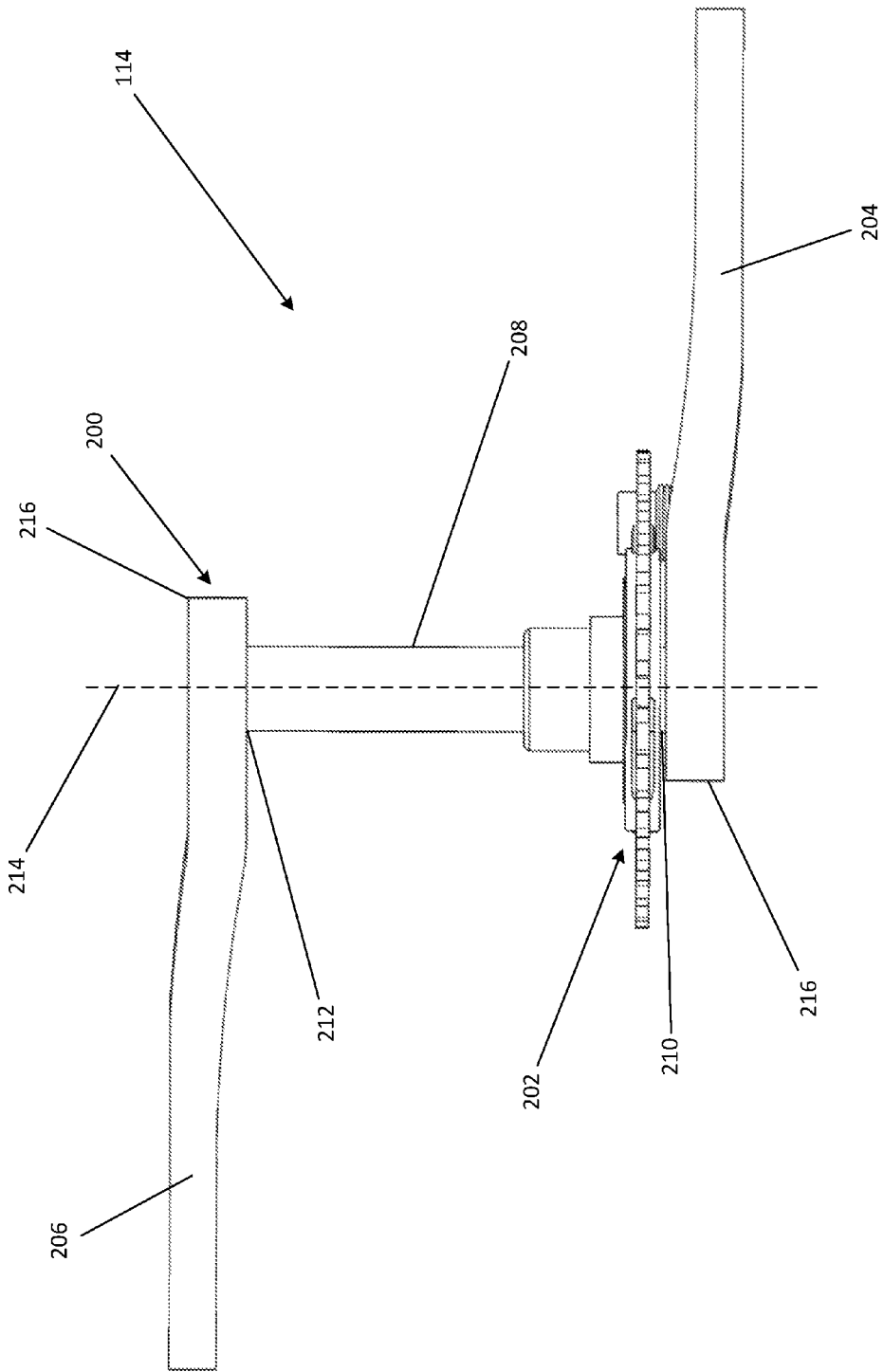
FIG. 2 shows a top plan view of one example of a crankset constructed in accordance with the teachings of the present disclosure that may be used in the bicycle of FIG. 1.

FIG. 2 shows a top plan view of one example of a crankset 114 constructed in accordance with the teachings of the present disclosure that may be used in the bicycle of FIG. 1. The crankset 114 includes a crankset or crank assembly 200 and a chainring assembly 202. The crank assembly 200 includes a first crank arm 204, a second crank arm 206, and a crankshaft 208 connecting the first crank arm 204 and the second crank arm 206 when the crankset 114 is assembled. The first crank arm 204 and/or the second crank arm 206 are removably attached to the crankshaft 208 at or adjacent a first end 210 of the crankshaft 208 and a second end 212 of the crankshaft 208, respectively. In one example, the first crank arm 204, the second crank arm 206, and the crankshaft 208 form a single part. The first crank arm 204 and the second crank arm 206 may be physically attached to the crankshaft 208 in any number of ways including, for example, with tapered (e.g., square tapered or hexagonal tapered) or splined ends 210, 212 of the crankshaft 208 and/or fasteners (e.g., bolts, nuts, and/or a cotter and corresponding openings through the first crank arm 204, the second crank arm 206, and the crankshaft 208, respectively). The first crank arm 204 and the second crank arm 206 are attached to the crankshaft 208 such that the first crank arm 204 and the second crank arm 206 extend in directions opposite each other (e.g., 180 degree separation relative to each other). The first crank arm 204 and the second crank arm 206 are rotatably fixed relative to the crankshaft 208 such that the 180 degree separation between the first crank arm 204 and the second crank arm 206 is maintained as the crank assembly 200 rotates about a crank axis 214 defined by the crankshaft 208. Pedals (not shown) are removably attached to the first crank arm 204 and the second crank arm 206, respectively, at or adjacent to first ends 216 of the first crank arm 204 and the second crank arm 206 using pedal attachment features 205 of the crank arms. The first crank arm 204, the second crank arm 206, and the crankshaft 208 may be any number of sizes depending on the size of the bicycle the crankset 114 is to be installed on. The first crank arm 204, the second crank arm 206, and the crankshaft 208 may be made of any number of materials including, for example, an aluminum alloy, titanium, carbon fiber, steel (e.g., chromoly steel), or any combination thereof.

Figure 3:
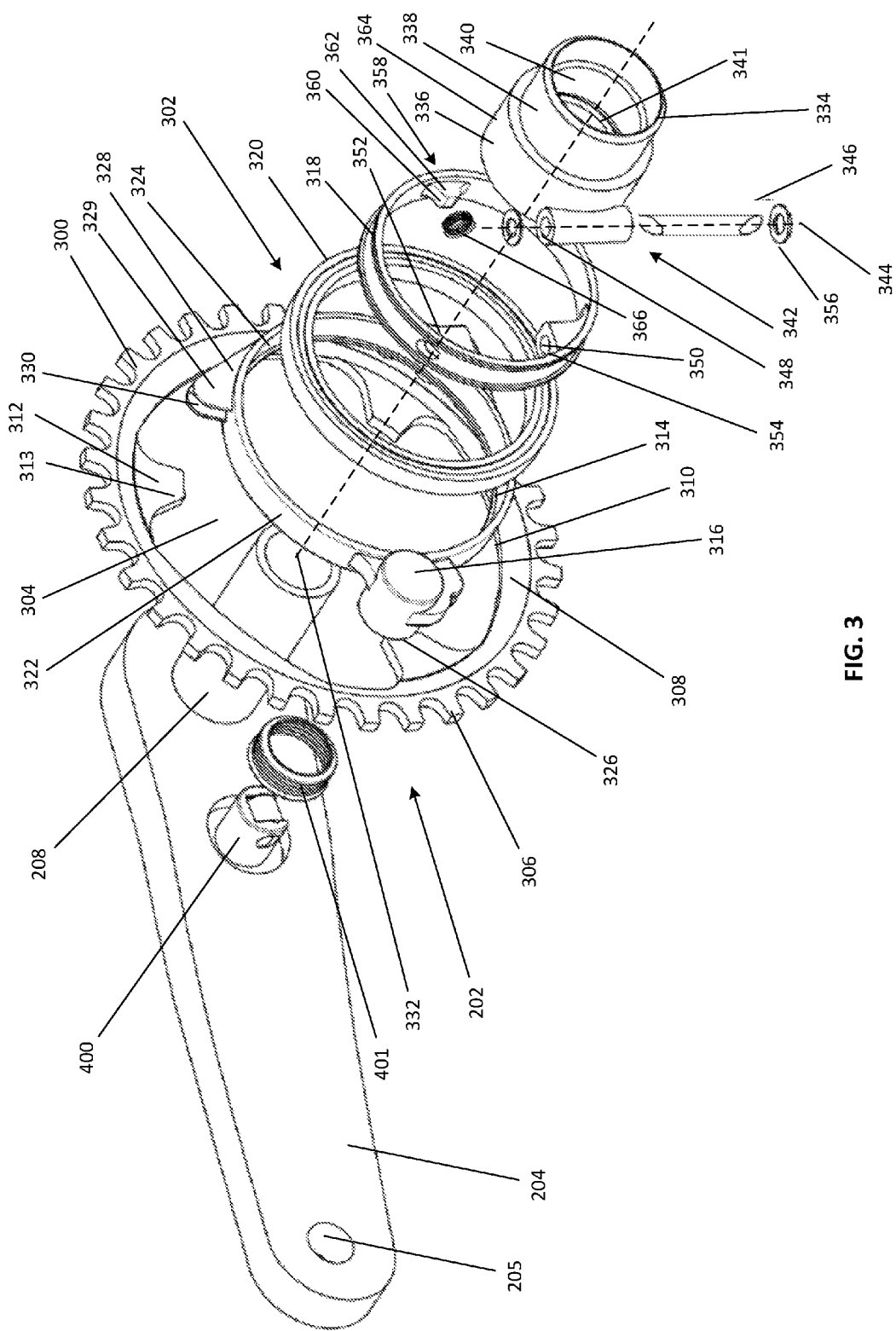
FIG. 3 shows a front or first side perspective exploded view of the crankset of FIG. 2 with a crank removed.

As described in greater detail below, the first crank arm 204 or the second crank arm 206 (e.g., the first crank arm 204 in FIG. 2) is connected to and drives at least a portion of the chainring assembly 202 at a radial distance away from the crank axis 214. FIG. 3 shows a front or first side perspective exploded view of the crankset 114 of FIG. 2 with a crank arm (e.g., the second crank arm 206) removed. As can be seen from FIG. 3 the crank arms 204, 206 may include a pedal attachment feature 205, such as a threaded hole. The chainring assembly 202 includes a chainring 300 and a carrier 302. The chainring 300 is annular and includes an opening 304 through which the crankshaft 208 extends. The chainring 300 also includes a plurality of teeth 306 disposed about a periphery of a body 308 of the chainring 300. The plurality of teeth 306 of the chainring 300 support and engage the chain 116 (see FIG. 1) to transfer power from the rider via the first crank arm 204, for example, to the rear wheel 110 (see FIG. 1). The plurality of teeth 306 may include any number of teeth (e.g., 20-60 teeth) depending on the type and size of the bicycle on which the chainring 300 is installed, as well as the application for which the bicycle will be used. The chainring 300 may be any number of sizes (e.g., diameter and width) again based on the type and size of the bicycle on which the chainring 300 is installed. The chainring 300 may be made of any number of materials including, for example, an aluminum alloy, titanium, steel, carbon fiber, or any combination thereof.

The opening 304 through which the crankshaft 208 extends is at least partially defined by an inner annular wall 310. In one example, the inner annular wall 310 of the chainring 300 includes one or more connection regions 312. The one or more connection regions 312 of the chainring 300 may include tabs, flanges, and/or extensions (e.g., three extensions) that extend away from the inner annular wall 310 of the chainring 300. As described in greater detail below, the extensions 313 may be used to attach the chainring 300 to the carrier 302.

The carrier 302 includes a chainring attachment portion 314, a crank assembly attachment portion 316, a pivot attachment portion 318, and a friction reducing device 320. Within the carrier 302, the chainring attachment portion 314 and the crank assembly attachment portion 316 are radially outer, and the pivot attachment portion 318 is radially inner. The chainring attachment portion 314 is annular and includes an outer annular surface 322 and an inner annular surface 324. The crank assembly attachment portion 316 extends away from the outer annular surface 322 of the chainring attachment portion 314 and is part of the chainring attachment portion 314 or is physically attached to the outer annular surface 322 of the chainring attachment portion 314. In the example shown in FIG. 3, the crank assembly attachment portion 316 includes a sliding surface (see FIG. 7) configured to attach the carrier 302 to a corresponding feature of a crank arm (e.g., the first crank arm 204). Other configurations may be provided for driving the chainring 300. In the example shown in FIG. 3, the sliding surface is formed by an inner surface of a sleeve 326 that forms a recess (see FIG. 7) into which a portion of the first crank arm 204, for example, extends when the crankset 200 is assembled (see FIG. 2). The sliding surface is disposed a radial distance from the crank axis.

Figure 4:
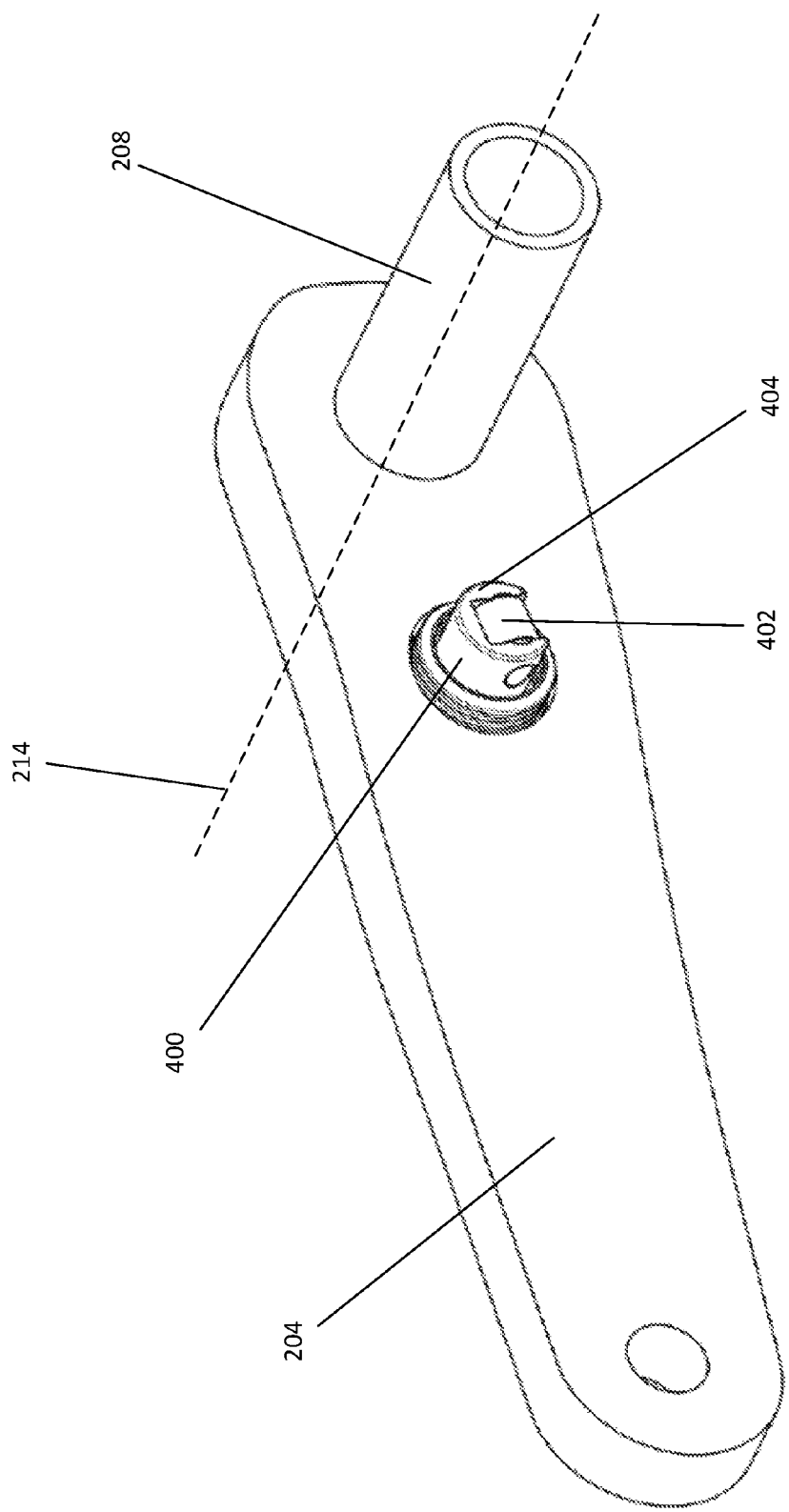
FIG. 4 shows a front or first side perspective view of a crank of the crankset of FIG. 2.

FIG. 4 shows a front or first side perspective view of the first crank arm 204 and the crankshaft 208 of the crankset 200 of FIG. 2. In the example shown in FIG. 4, the first crank arm 204 includes a carrier attachment portion, such as a drive pin 400. The drive pin 400 may be physically attached to the first crank arm 204 in any number of ways. In one example, the drive pin 400 includes a male thread and is threaded into a female threaded portion of the first crank arm 204. In another example, the drive pin 400 and the first crank arm 204 are formed as a single part. The carrier attachment portion (e.g. pin 400) may also include a cover 401, such as a boot or other device, to protect the structure from the introduction of foreign debris and/or dust during use.

Figure 7:
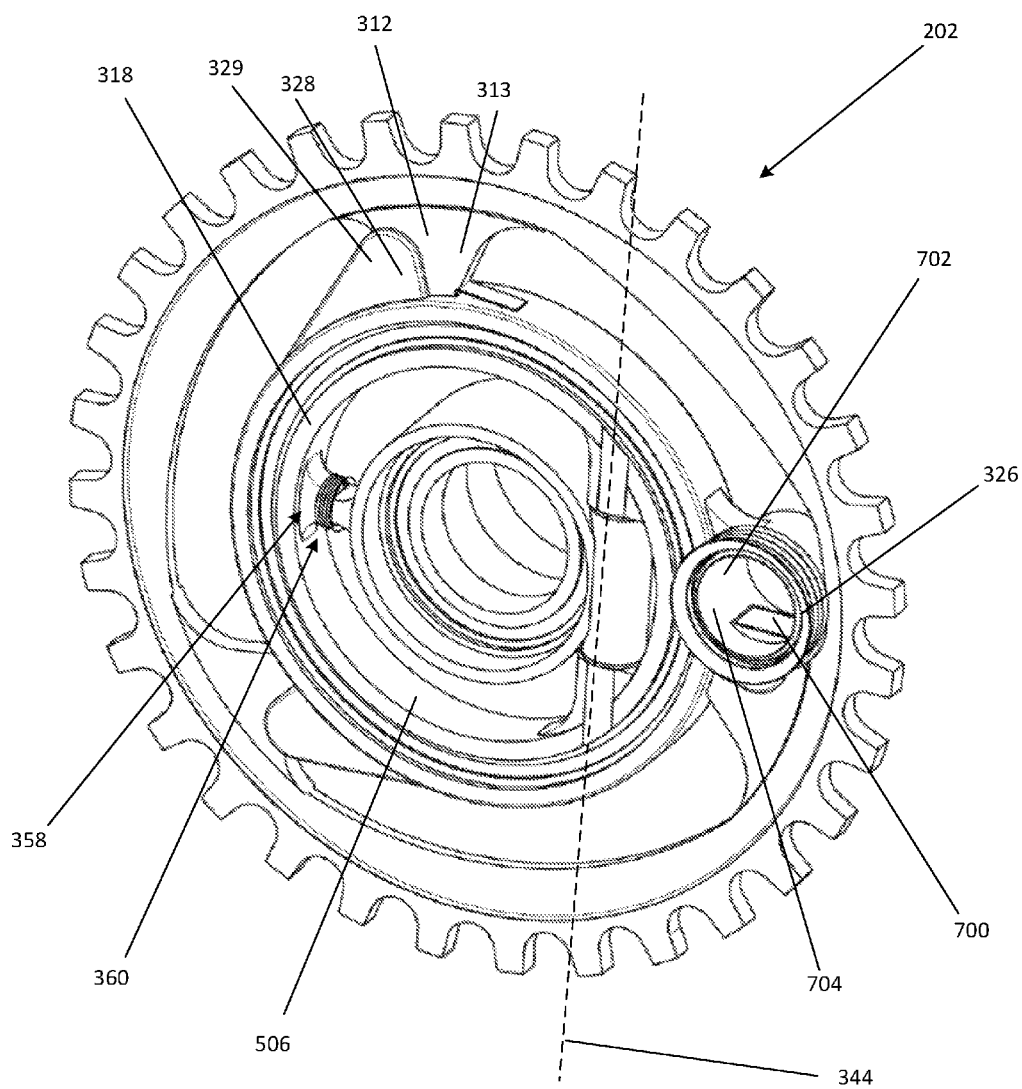
FIG. 7 shows a rear or second side perspective view of a chainring assembly of FIG. 2.

The drive pin 400 may be any number of shapes including, for example, cylindrical and is sized and shaped to fit within the recess formed by the inner surface of the sleeve 326 of the crank assembly attachment portion 316 (see FIG. 7). In the example shown in FIG. 4, the drive pin 400 includes a roller or bearing 402 (e.g., a needle bearing) at an end 404 of the drive pin 400. The needle bearing 402 aids in movement of the drive pin 400 along the sliding surface of the crank assembly attachment portion 316. In other examples, the second crank arm 206 may include the components described above instead of the first crank arm 204.

As the rider rotates the first crank arm 204 about the crank axis 214, the drive pin 400 transmits torque to the chainring attachment portion 314 via the crank assembly attachment portion 316 (e.g., the sleeve 326). As shown in FIG. 3, the chainring attachment portion 314 includes at least one connecting region 328 (e.g., three connecting regions). The connecting region 328 is radially inner of the plurality of teeth 306 of the chainring 300. Each of the connection regions 328 may include one or more tabs, flanges, extensions 329 (e.g., two, three, or more extensions), other connectors, or any combination thereof that extend away from the outer annular surface 322 of the chainring attachment portion 314. The extensions 329 form a slot 330 into which one of the extensions 313 of the chainring 300 may be positioned. The chainring attachment portion 314 is physically attached to the chainring 300 via, for example, a fastener (e.g., a screw or a nut/bolt combination) extending through the extensions 329 of the chainring attachment portion 314 and the one extension 313 of the chainring 300. The chainring attachment portion 314 and the chainring 300 may be physically attached to each other in any number of other ways.

Figure 5:
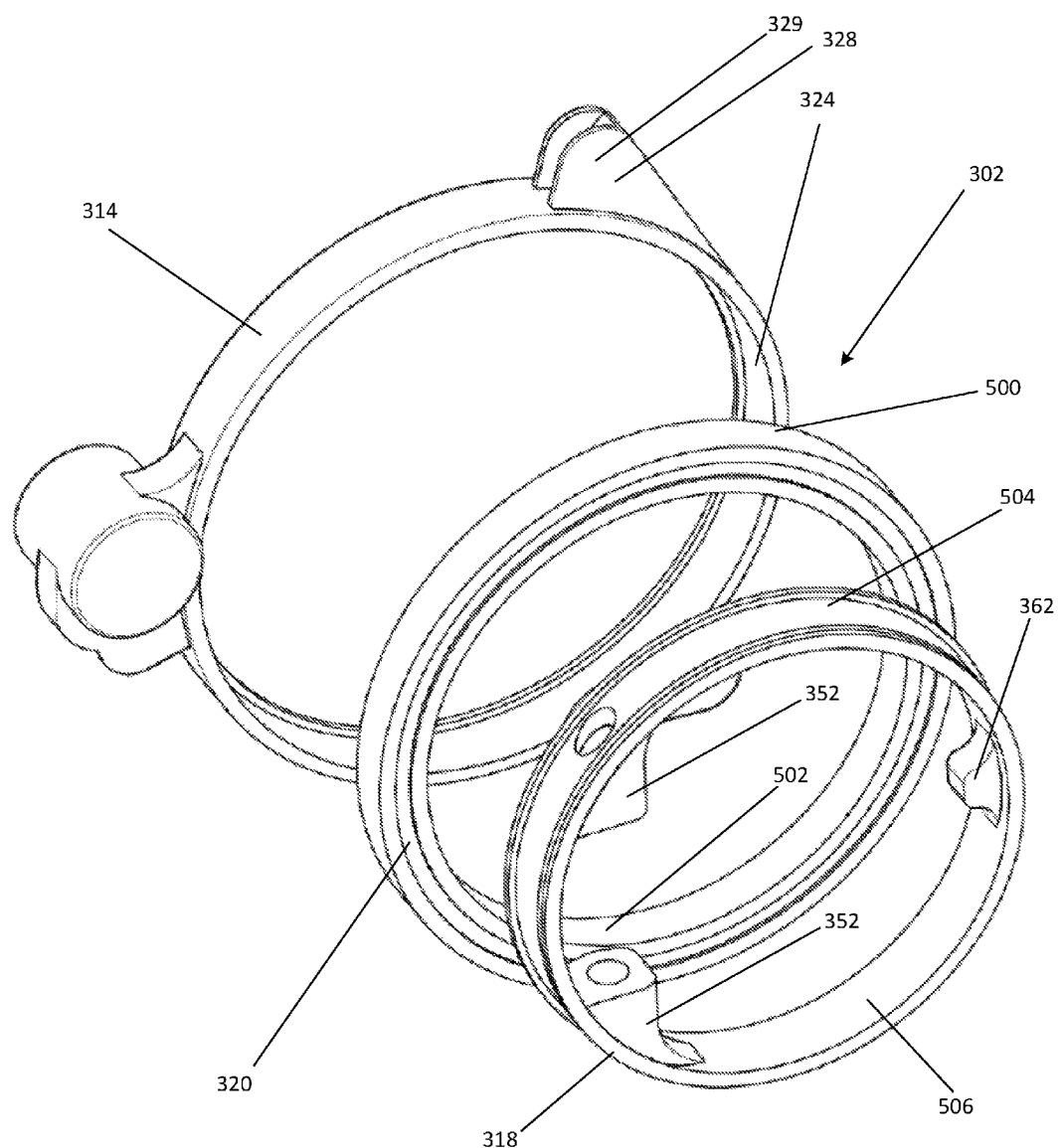
FIG. 5 shows a front or first side perspective exploded view of a carrier of the crankset of FIG. 2.

Due to the physical attachment of the chainring 300 to the chainring attachment portion 314 of the carrier 302, the torque transmitted from the drive pin 400 to the chainring attachment portion 314 causes the chainring 300 to rotate about a rotation axis 332 for a portion of the carrier 302. As discussed further below, the rotation axis 332 may be the same as or different than the crank axis 214, depending on whether the carrier 302 and the chainring 300 are tilted. As illustrated with FIG. 5, the rotation axis 332 is defined by the friction reducing device 320. FIG. 5 shows a front or first side perspective exploded view of the carrier 302 of the crankset 114 of FIG. 2. The friction reducing device 320 is disposed between the chainring attachment portion 314 and the pivot attachment portion 318. In other words, the friction reducing device 320 is radially inward of the chainring attachment portion 314, and radially outward of the pivot attachment portion 318. The friction reducing device 320 is, for example, an annular rolling-element bearing that includes an outer race 500 and an inner race 502. Other types of bearings or friction reducing devices may be used. For example, a low friction sleeve or polished surfaces may be used. The friction reducing device 320 reduces friction of rotational movement between the chainring attachment portion 314 and the pivot attachment portion 318.

Figure 6:
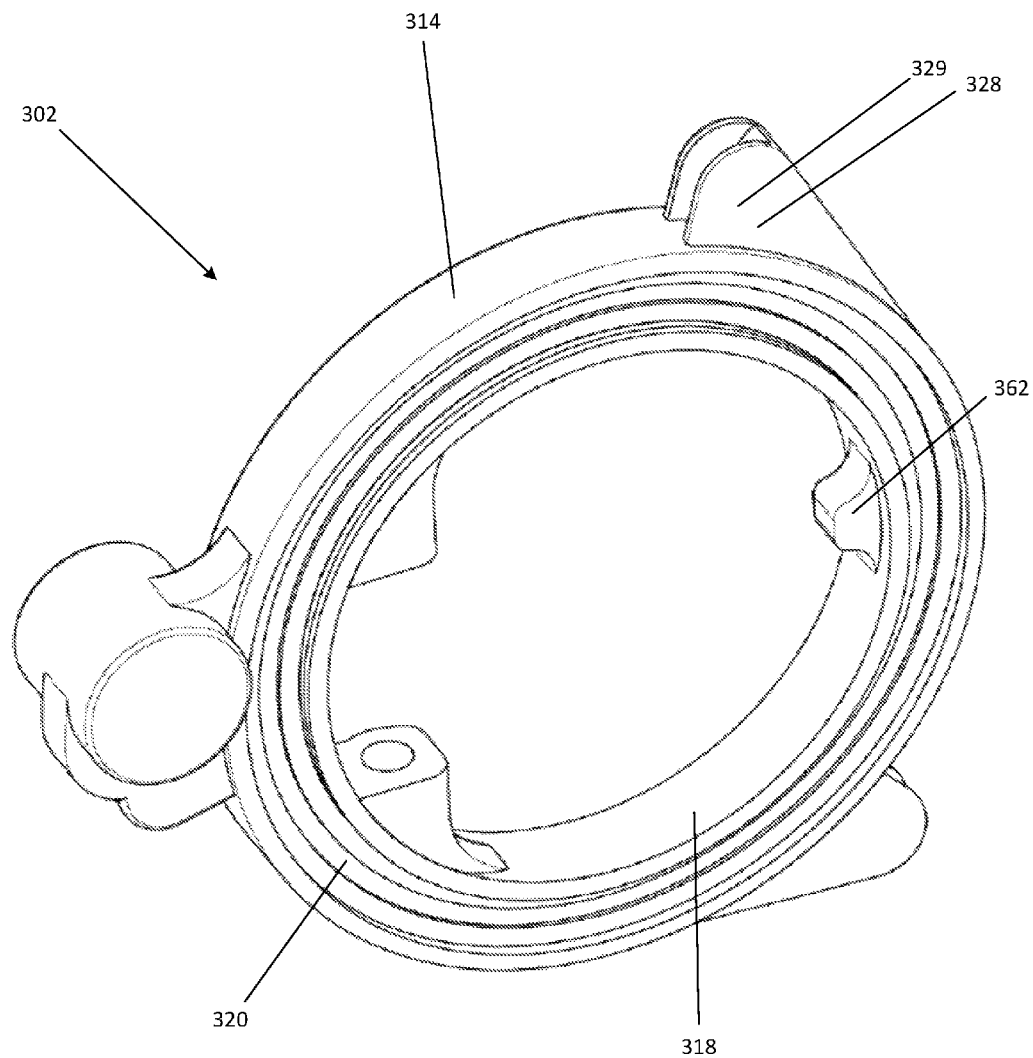
FIG. 6 shows a front or first side perspective view of the carrier of FIG. 5 assembled.

The pivot attachment portion 318 is also annular and includes an outer annular surface 504 and an inner annular surface 506. When assembled, the inner race 502 of the friction reducing device 320 is physically attached to the outer annular surface 504 of the pivot attachment portion 318. The inner race 502 of the friction reducing device 320 is physically attached to the outer annular surface 504 of the pivot attachment portion 318, such that the inner race 502 of the friction reducing device 320 is rotationally fixed relative to the pivot attachment portion 318. The inner race 502 of the friction reducing device 320 is physically attached to the outer annular surface 504 of the pivot attachment portion 318 in any number of ways including, for example, with a snap ring, fasteners, a friction fit, tabs, flanges, extensions, another connector, or any combination thereof. In one example, the pivot attachment portion 318 is formed as part of the inner race 502 of the friction reducing device 320. In another example, the pivot attachment portion 318 and the inner race 502 of the friction reducing device 320 are formed as an integral single piece structure. When assembled, the outer race 500 of the friction reducing device 320 is physically attached to the inner annular surface 324 of the chainring attachment portion 314. The outer race 500 of the friction reducing device 320 is physically attached to the inner annular surface 324 of the chainring attachment portion 314, such that the chainring attachment portion 314 is rotationally fixed relative to the outer race 500 of the friction reducing device 320. The outer race 500 of the friction reducing device 320 is physically attached to the inner annular surface 324 of the chainring attachment portion 314 in any number of ways including, for example, with a snap ring, fasteners, a friction fit, tabs, flanges, extensions, another connector, or any combination thereof. In one example, the chainring attachment portion 314 is formed as part of the outer race 500 of the friction reducing device 320. In another example, the chainring attachment portion 314 and the outer race 500 of the friction reducing device 320 are formed as an integral single piece structure. FIG. 6 shows a front or first side perspective view of the carrier 302 of FIG. 5 assembled. As illustrated with FIG. 6, at least some components of the carrier 302 (e.g., the chainring attachment portion 314, the pivot attachment portion 318, and the friction reducing device 320 may have a same width, The pivot attachment portion 318 is attached to the frame 102 of the bicycle 100, for example, such that the pivot attachment portion 318 does not rotate about the rotation axis 332 or the crank axis 214. The pivot attachment portion 318 is attached to the frame 102 of the bicycle 100 via a bracket mount 334. In the example shown in FIG. 3, the bracket mount 334 is annular and includes a first outer annular surface 336, a second outer annular surface 338, and at least one inner annular surface 340. The first outer annular surface 336 and the second outer annular surface 338 may have different diameters. For example, the diameter of the first outer annular surface 336 may be larger than the diameter of the second outer annular surface 338. The at least one inner annular surface 340 defines an opening 341 through the bracket mount 334, through which the crankshaft 208 extends and rotates during operation. The bracket mount 334 is rotatably fixed relative to the frame 102 of the bicycle 100 in any number of ways including, for example, via a threaded connection, mating mounts, or a press-fit. In one example, the second outer annular surface 338 includes threads that are threaded into a threaded female connector within the frame 102 of the bicycle 100. In another example, the bracket mount 334 includes a single outer annular surface, and a portion of the single outer annular surface includes threads. The bracket mount 334 may be fixably attached to the frame 102 of the bicycle 100 in other ways.

As shown in FIG. 3, a pivot 342 rotatably attaches the pivot attachment portion 318 to the bracket mount 334 and defines a pivot axis 344 about which the pivot attachment portion 318 is rotatable. The pivot 342 includes a pin 346 that rotatably couples the pivot attachment portion 318 with the bracket mount 334. The pin 346, which extends through an opening 348 through the bracket mount 334 and corresponding openings 350 through the pivot attachment portion 318, defines the pivot axis 344. Both ends of the pin 346 are beveled to allow attachment of the friction reducing device 320 to the pivot attachment portion 318. In one example, the ends of the pin 346 are beveled such that the ends of the pin 346 are flush with an outer surface of the pivot attachment portion 318 (e.g., the outer annular surface 504). The friction reducing device 320 locks the pin 346 into place when the carrier 302 is assembled.

As shown in FIGS. 3 and 5, the pivot attachment portion 318 includes extensions 352 extending away from the inner annular surface 506 of the pivot attachment portion 318. The extensions 352 include the openings 350 through the pivot attachment portion 318 for the pin 346. The extensions 352 include flat surfaces 354, respectively, for support of the pivot attachment portion 318 on the bracket mount 334 and alignment of the opening 348 through the bracket mount 334 with the openings 350 through the pivot attachment portion 318 (e.g., the extensions 352). In one example, the pin 346 extends through one or more washers 356 (e.g., two washers) disposed between the extensions 352 of the pivot attachment portion 318 and the bracket mount 334, respectively. The one or more washers 356 reduce friction in the rotation of the pivot attachment portion 318 and thus the carrier 302 and the chainring 300 about the pivot axis 344. In an embodiment, the washers are made from polytetrafluoroethylene ("PTFE") or similar materials.

The pivot axis 344 is offset from the rotation axis 332 and the crank axis 214. The chainring assembly 202 is configured to rotate (e.g., tilt, pivot) about the pivot axis 344. The pivot axis 344 is at an angle (e.g., perpendicular) relative to the rotation axis 332 and the crank axis 214. In one example the pivot axis 344 is disposed a distance farther from a rear wheel axis of the bicycle 100 than the rotation axis 332 or the crank axis 214 is disposed from the rear wheel axis. The crank axis 214 and the rotation axis 332 are coplanar in a plane that may, for example, be perpendicular to the pivot axis 344. The chainring 300 rotates about both the crank axis 214 and the rotation axis 332. When the chainring 300 is tilted about the pivot axis 344, the crank axis 214 may not define the center of rotation for the chainring 300. When the chainring 300 is tilted about the pivot axis 344, the crank axis 214 and the rotation axis 332 may remain coplanar, but the rotation axis 332 may be at an angle relative to the crank axis 214.

In one example, the carrier 302 also includes a rotation resistance device 358 configured to resist the rotation of the carrier 302 and the chainring 300 about the pivot axis 344. The rotation resistance device acts as a damper in reducing wobble induced by the chainring 300 rotating about the pivot axis 344. As shown in FIGS. 3 and 5, in one example, the rotation resistance device includes a detent mechanism 360. The detent mechanism 360 is a spring-loaded device and includes a body 362 at a distance away from the inner annular surface 506 of the pivot attachment portion 318. The body 362 may be a sphere, an extension, a pin, or any other type of body. The body 362 may be supported along the inner annular surface 506 such that the body 362 is a maximum distance away from the pivot axis 344. Other positions of the body 362 may be provided. The detent mechanism 360 also includes indentations 364 within the bracket mount 334 (e.g., the first outer annular surface 336 of the bracket mount 334), into which the body 362 supported by the pivot attachment portion 318 may extend. The detent mechanism 360 may include a single row or multiple rows (e.g., two rows) of indentations 364. The detent mechanism 360, and more specifically, the indentations 364 in the bracket mount 334 define possible tilt angles of the carrier 302 relative to the rotation axis 332 and/or the crank axis 214 (e.g., preset detent positions). In one example, the detent mechanism 360 includes an indentation 364 in the bracket mount 334 for each of the tilt angles corresponding to the sprockets 119 of the rear cassette 118, respectively. In another example, the detent mechanism 360 includes fewer indentations in the bracket mount 334, and the spring force of the spring-loaded body 362 and the depth of the indentations 364 are set such that a number of sprockets 119 within the rear cassette 118 are moved through before the body 362 moves to another indentation 364 within the bracket mount 334. In other words, the spring-loaded body 362 moves to another indentation 364 when a predetermined angle between the chainring 300 and the active sprocket 119 of the rear cassette 118 is exceeded. The body 362 of the detent mechanism 360 may include a cover 366 (e.g., a dust boot) to prevent wear and aid in the seating of the body 362 within the indentation 364. The cover 366 may be made of any number of materials including, for example, rubber. The cover 366 may be attached to the body 362 in any number of ways including, for example, with an adhesive and/or by press-fitting.

Figure 8:
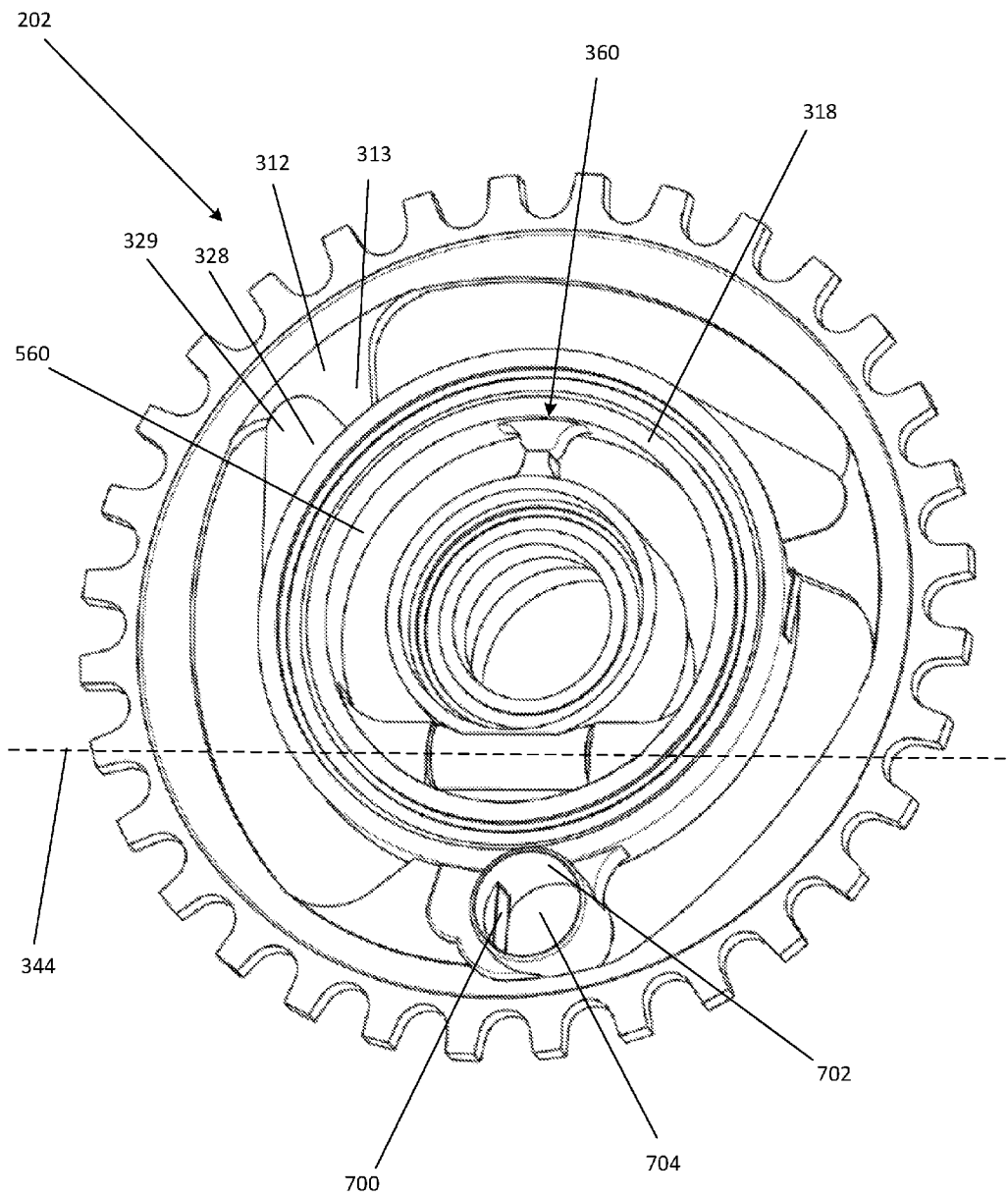
FIG. 8 shows another rear or second side perspective of the chainring assembly of FIG. 2.

FIGS. 7 and 8 show rear or second side perspective views, respectively, of the chainring assembly 202 of FIG. 2. As illustrated with FIGS. 7 and 8, the detent mechanism 360 is opposite the pivot axis 344. In other words, the extension configuration of the body 362 is positioned on the inner annular surface 506 of the pivot attachment portion 318 at a maximum distance away from the pivot axis 344. This positioning of the detent mechanism 360 away from the pivot axis 344 allows the spring-loaded extension configuration of the body 362 to better move in and out of the indentations compared to other positioning of the detent mechanism 360 relative to the pivot axis 344.

FIGS. 7 and 8 also illustrate a sliding surface 700 of the crank assembly attachment portion 316 on which the drive pin 400 moves (e.g., slides) when the first crank arm 204, for example, rotates about the crank axis 214 and drives the chainring 300 and the carrier 302. As shown in the example of FIGS. 7 and 8, the sliding surface 700 may be a portion of an inner surface 702 of the sleeve 326 that forms the recess 704 in which the drive pin 400 is positioned. In the example shown in FIGS. 7 and 8, the sliding surface 700 is a flat surface. In another example, the sliding surface 700 is a curved surface. The flat sliding surface 700 may constrain the distance the drive pin 400 is able to move radially when the first crank arm 204, for example, rotates about the crank axis 214 and drives the chainring 300 and the carrier 302.

Figure 9:
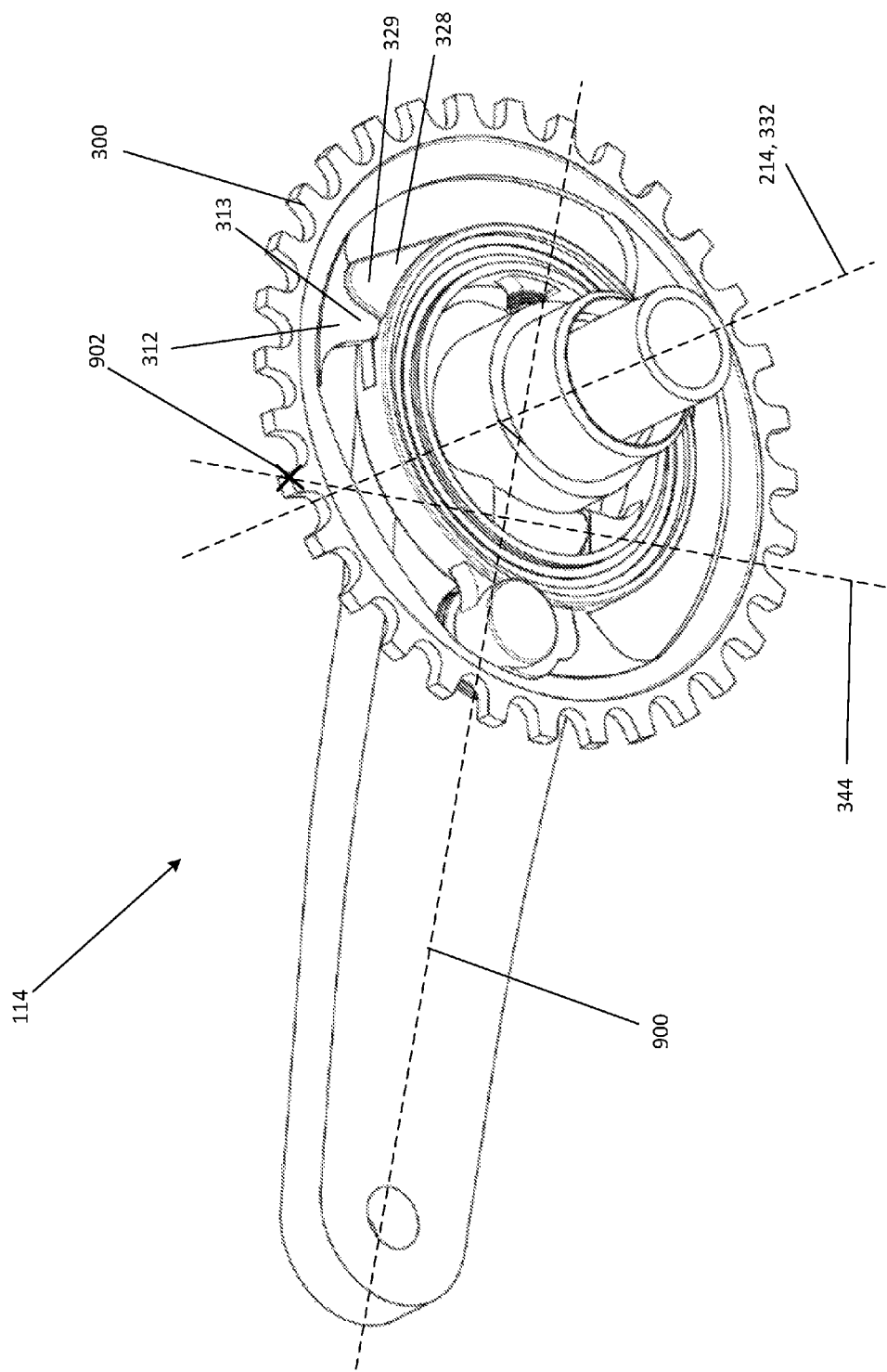
FIG. 9 shows a front or first side perspective view of the crankset of FIG. 2 assembled with a crank removed.
Figure 10:
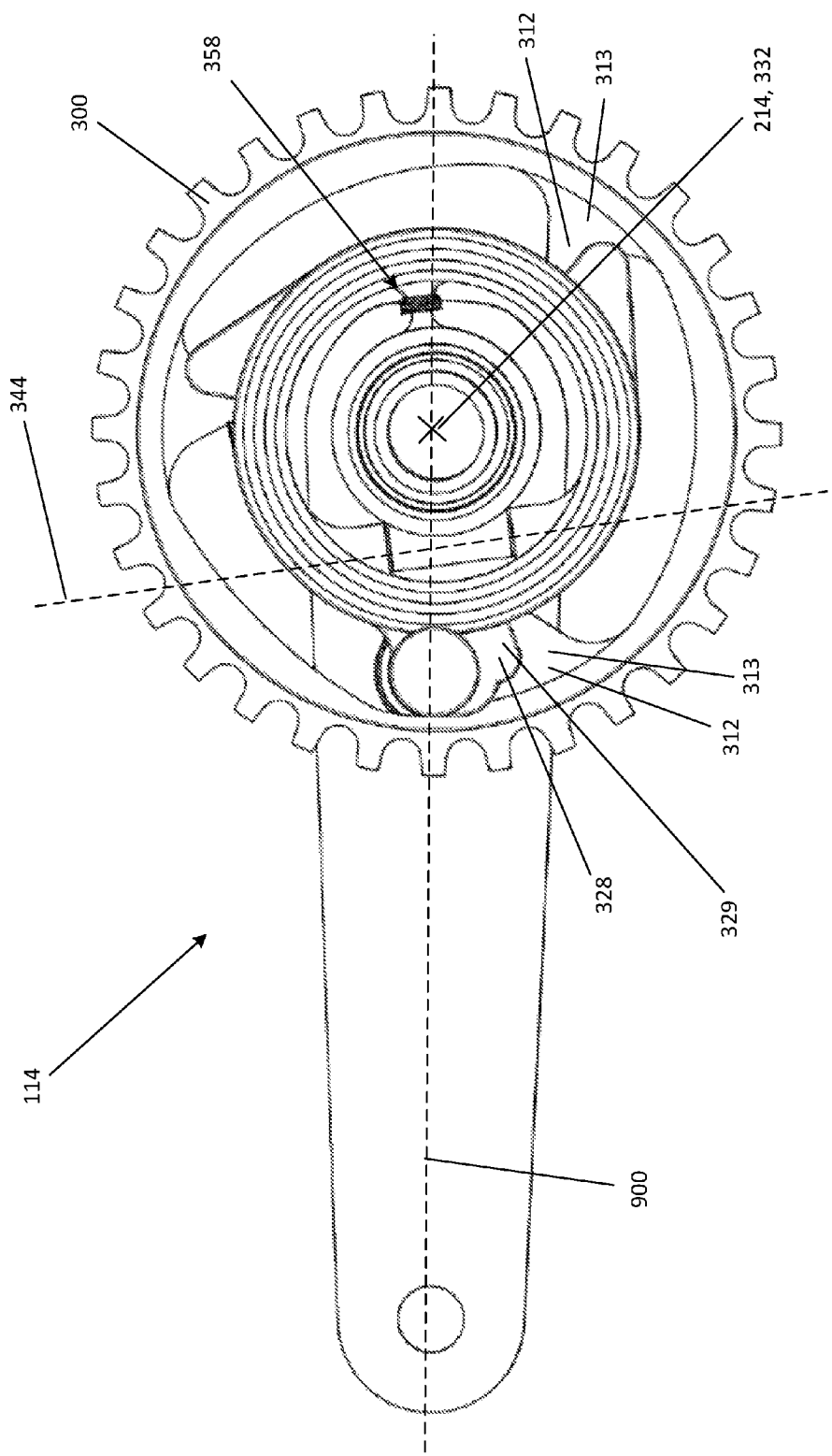
FIG. 10 shows a front or first side elevation view of the crankset of FIG. 2 assembled with a crank removed.
Figure 11:
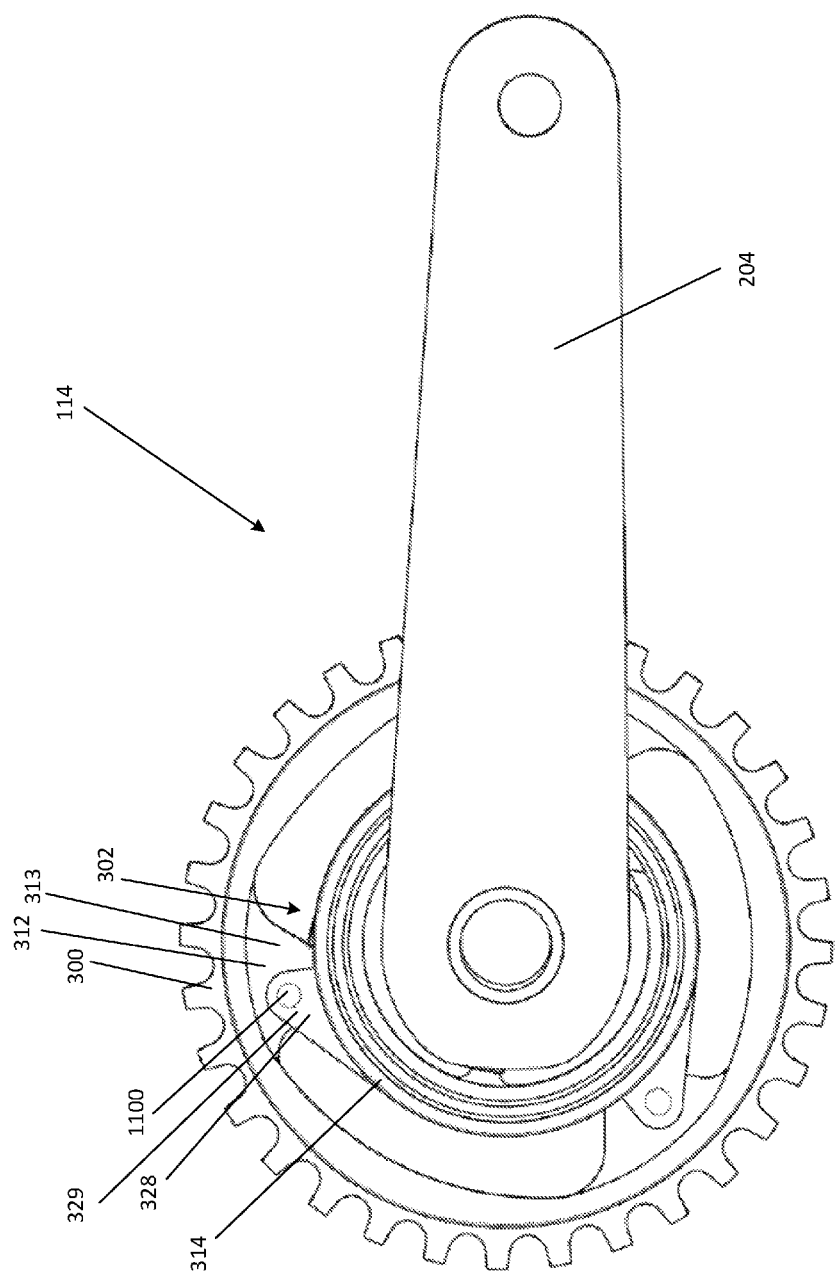
FIG. 11 shows a rear or second side elevation view of the crankset of FIG. 2 assembled with a crank removed.
Figure 12A:
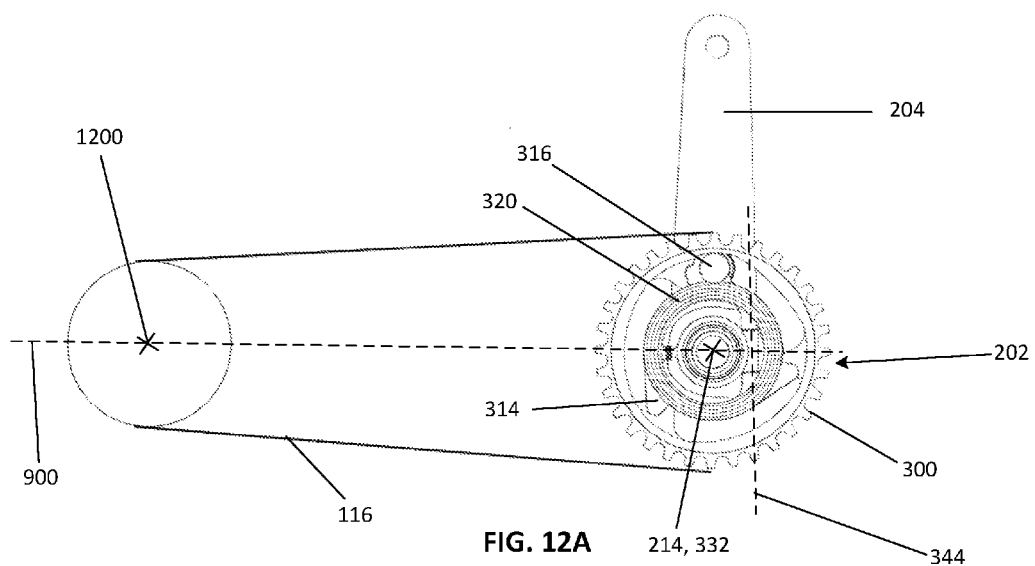
FIGS. 12A-12D show front or first side elevation views of one example of a crankset with a portion of the crankset in different positions rotated about a rotation axis.
Figure 12B:
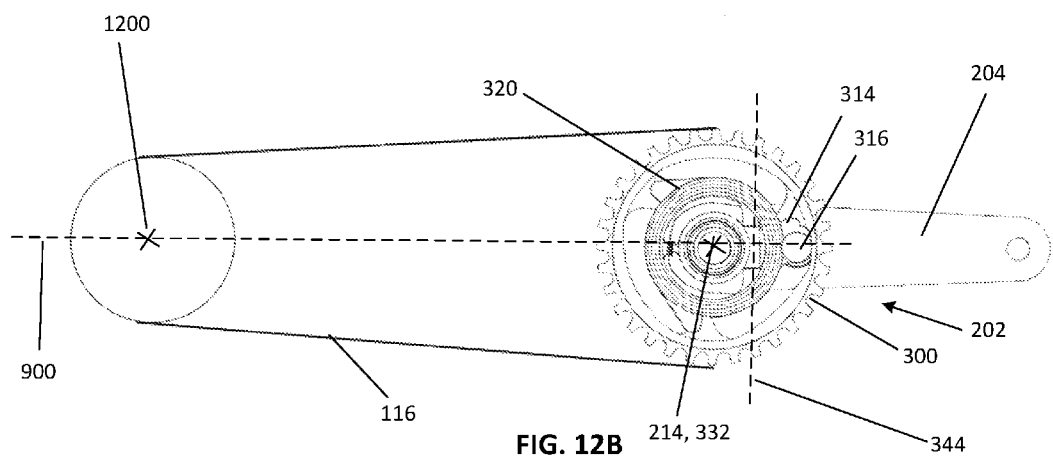
Figure 12C:
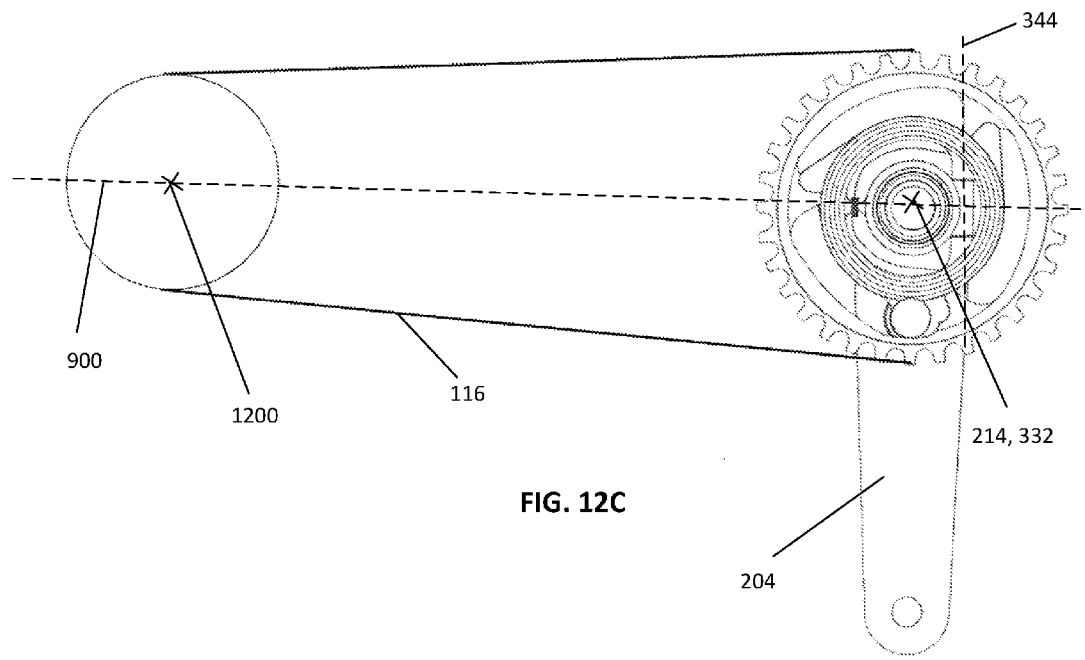
Figure 12D:
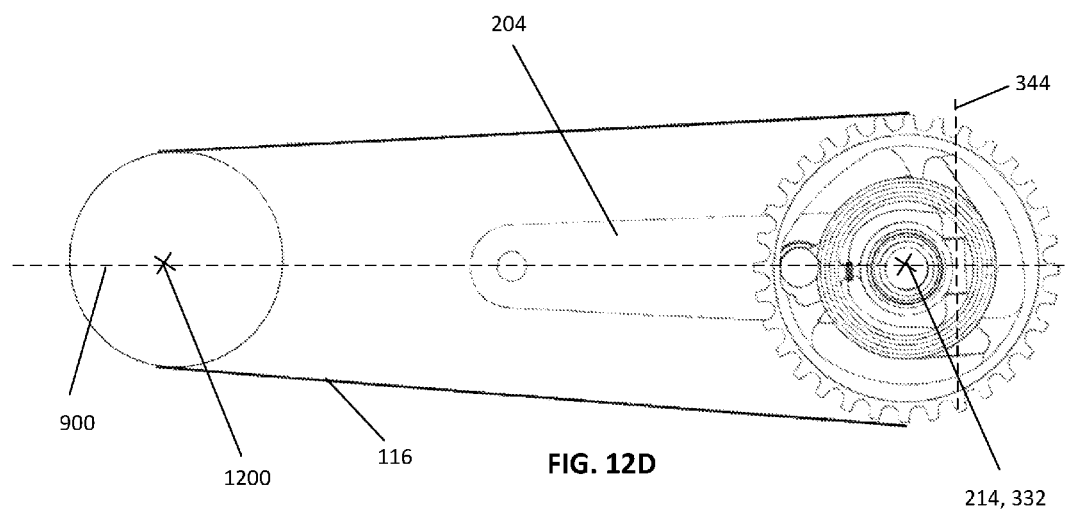
Figure 13A:
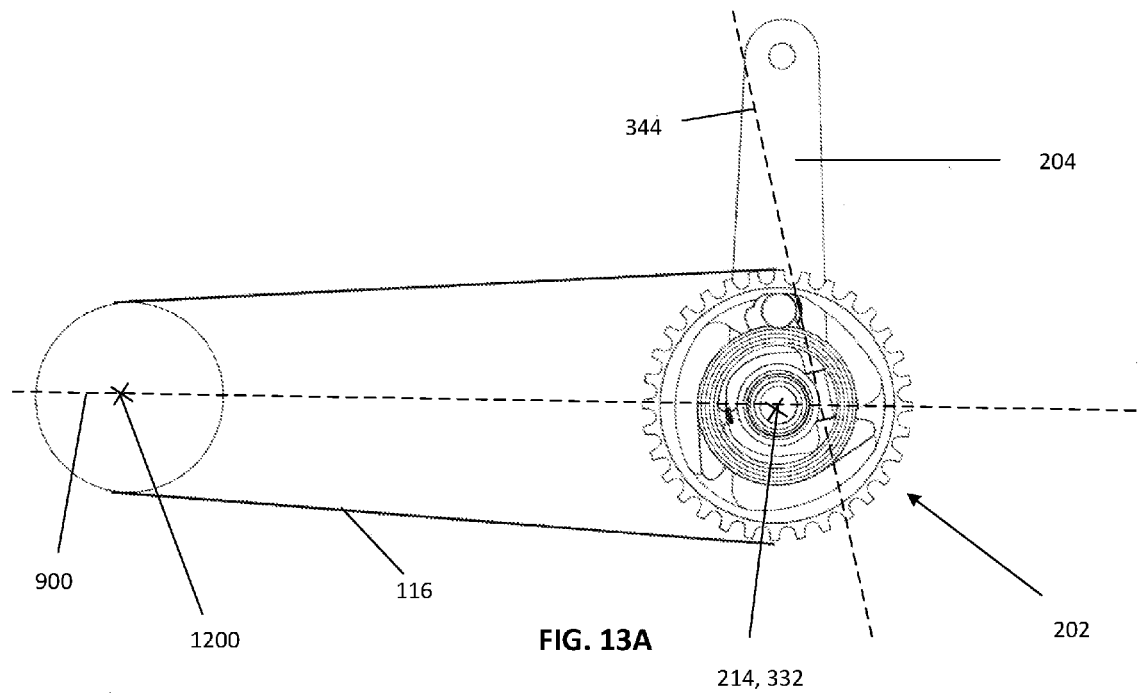
FIGS. 13A-13D show front or first side elevation views of another example of a crankset with a portion of the crankset in different positions rotated about a rotation axis.
Figure 13B:
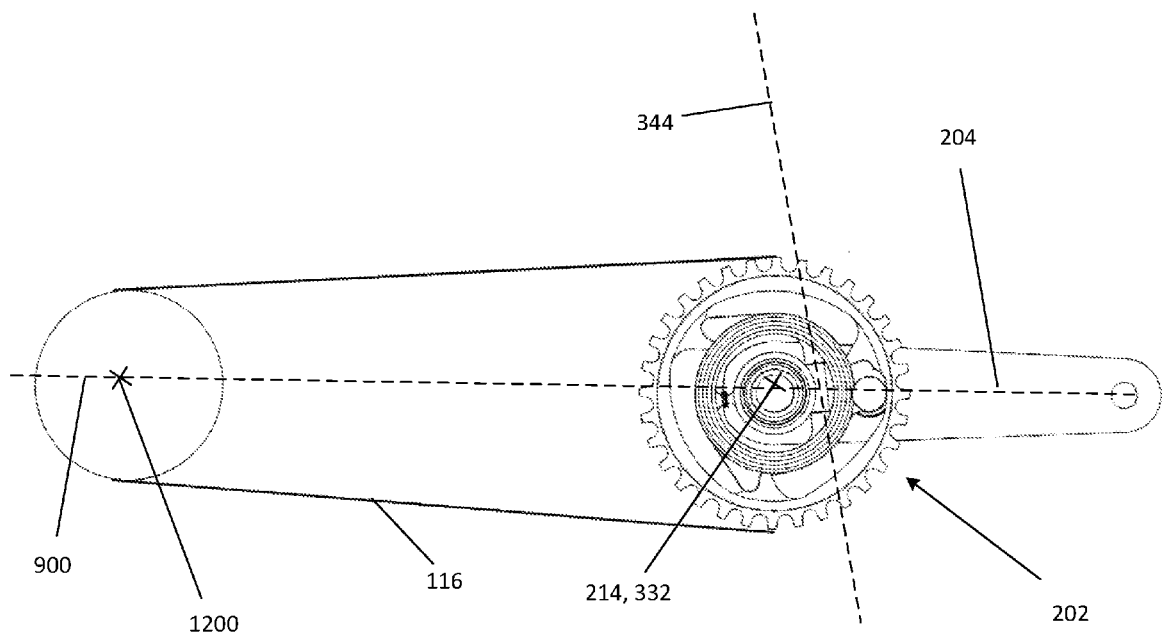
Figure 13C:
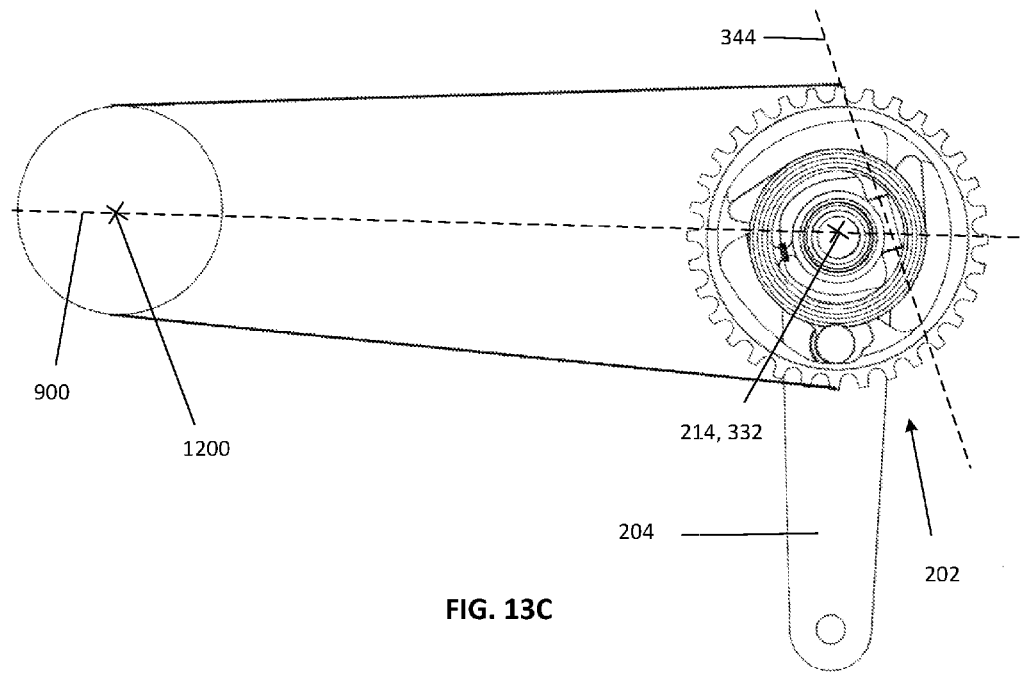
Figure 13D:
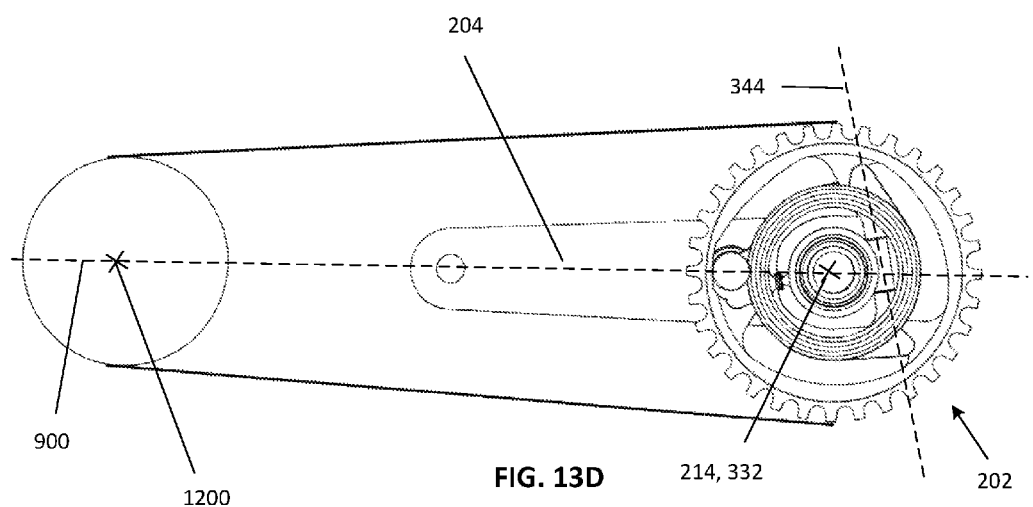

FIGS. 9-11 show respective views of the crankset 114 of FIG. 2 assembled with the second crank arm 206 removed. FIGS. 9-11 illustrate the position and orientation of the pivot axis 344 relative to the rotation axis 332 of the chainring 300 and the crank axis 214. The pivot axis 344 is positioned a distance (e.g., defining a trail) from the rotation axis 332. In one example, the distance the pivot axis 344 is positioned relative to the rotation axis 332 is maximized depending on the respective sizes of the components of the chainring assembly 202 (e.g., the chainring 300). The pivot axis 344 is perpendicular to the rotation axis 332 of the chainring 300 and the crank axis 214. The pivot axis 344 may also be perpendicular to an axis 900 that extends between the crank axis 214 and an axis about which the sprockets 119 of the rear cassette 118 rotate (see FIGS. 12A-12D). As shown in the example of FIG. 10, the pivot axis 344 may be at an angle less than 90 degrees relative to the axis 900.

FIG. 9 shows a front or first side perspective view of the crankset 114 of FIG. 2 assembled with the second crank arm 206 removed. FIG. 9 illustrates an intersection 902 of the pivot axis 344 with the periphery of the chainring 300.

FIG. 11 shows a rear or second side elevation view of the crankset 114 of FIG. 2 assembled with the second crank arm 206 removed. FIG. 11 illustrates a way in which the chainring attachment portion 314 may be physically attached to the chainring 300 such that torque transmitted from the first crank arm 204 to the carrier 302, for example, is also transmitted to the chainring 300. At least one of the connecting regions 328 (e.g., three connecting regions) of the chainring attachment portion 314 may include an opening 1100 that extends through the connecting region 328. The opening 1100 through the connecting region 328 of the chainring attachment portion 314 may correspond with an opening (not shown) through one of the connecting regions 312 of the chainring 300. A connector (e.g. a screw or a bolt) may extend through the opening 1100 through the connecting region 328 and the opening through the corresponding connection region 312 of the chainring 300. The connector may fixably mount (e.g., with threads or a bolt) the chainring 300 to the chainring attachment portion 314.

FIGS. 12A-12D show front or first side elevation views of one example of the crankset 114 of FIG. 2 with the first crank arm 204 in different positions rotated about the crank axis 214. FIGS. 12A-12D illustrate that the pivot axis 344 is rotationally fixed relative to the rotation axis 332 of the chainring 300 and the crank axis 214 as the first crank arm 204 rotates around the crank axis 214. In other words, as the crank assembly attachment portion 316, the chainring attachment portion 314, and the chainring 300 rotate about the rotation axis 332 with the outer race 500 of the friction reducing device 320, the pivot axis 344 remains rotationally fixed relative to the rotation axis 332. In the example of FIGS. 12A-12D, the pivot axis 344 is perpendicular to the rotation axis 332 of the chainring 300 and the axis 900 extending between the crank axis 214 and an axis 1200 about which the sprockets of the rear cassette 118 rotate.

FIGS. 13A-13D show front or first side elevation views of another example of the crankset 114 of FIG. 2 with the first crank arm 204 in different positions rotated about the crank axis 214. FIGS. 13A-13D again illustrate that the pivot axis 344 is rotationally fixed relative to the rotation axis 332 of the chainring 300 as the first crank arm 204 rotates around the crank axis 214. In the example of FIGS. 13A-13D, the pivot axis 344 is perpendicular to the rotation axis 332 of the chainring 300 but at an angle less than 90 degrees relative to the axis 900 extending between the crank axis 214 and the axis 1200 about which the sprockets of the rear cassette 118 rotate.

The pivot axis 344 being rotatably fixed relative to the rotation axis 332 of the chainring 300 allows the chainring assembly 202 and thus the chainring 300 to tilt or pivot as different sprockets are selected within the rear cassette 118. This reduces wear and load stress on the chainring 300, the chain 116, and the sprockets 119 of the rear cassette 118. FIGS. 14A-14D show different tilt angles of the chainring assembly 202 for a single position of the first crank arm 204 of the crankset 114 of FIG. 2. FIGS. 14A-14D illustrate an example of the rear cassette 118 that includes twelve sprockets 119. The rear cassette 118 may include more or fewer sprockets 119.

FIG. 14C illustrates an example where the chainring assembly 202 is not tilted about the pivot axis 344. In other words, the chainring 300 of the chainring assembly 202 is coplanar with the sprocket 119 (e.g., the fifth-largest or fifth sprocket) of the rear cassette 118 to which the chainring 300 is connected via the chain 116. The coplanar sprocket 119 may be the sprocket typically used most during operation of the bicycle 100, for example. The bicycle 100, for example, may be configured such that the chainring 300 is coplanar with any of the twelve sprockets 119, for example, when the chainring 300 is un-pivoted.

The connection of the chainring 300 with the fifth sprocket 119 of the rear cassette 118 forms a straight chainline 1400. FIGS. 14A, 14B, and 14D each include a representation of the straight chainline 1400 as a reference. FIG. 14A illustrates a first and largest tilt angle α of the chainring assembly 202 about the pivot axis 344 relative to the straight chainline 1400. In the example shown in FIG. 14A, the chainring 300 is connected to the largest or twelfth sprocket 119 via the chain 116. FIG. 14B illustrates a second tilt angle α of the chainring assembly 202 about the pivot axis 344 relative to the straight chainline 1400. In the example shown in FIG. 14B, the chainring 300 is connected to the eighth-largest or eighth sprocket 119 via the chain 116. FIG. 14D illustrates a third tilt angle α of the chainring assembly 202 about the pivot axis 344 relative to the straight chainline 1400. In the example shown in FIG. 14D, the chainring 300 is connected to the smallest or first sprocket 119 via the chain 116. As discussed above, the detent mechanism 360 may be configured such that the chainring assembly 202 rotates about the pivot axis 344 after a predetermined number of sprockets 119 are moved through. For example, the straight chainline 1402 is maintained as the sixth sprocket 119 and the seventh sprocket 119 are moved through. The spring-loaded extension 362 of the detent mechanism 360 may move out of a first indentation corresponding to the fifth sprocket 119, the sixth sprocket 119, and the seventh sprocket 119, and the chainring assembly 202 may pivot about the pivot axis 344 when the chain 116 is moved from the seventh sprocket 119 to the eighth sprocket 119. The spring-loaded body 362 may move into a second indentation 364 corresponding to the eighth sprocket 119, the ninth sprocket 119, the tenth sprocket 119, and the eleventh sprocket 119. Each indentation 364 of the detent mechanism 360 may correspond to a same number of sprockets 119 or different numbers of sprockets 119.

FIGS. 15A-15C show a same tilt angle of a portion of a chainring assembly 202 for a number of different positions of the first crank arm 204 of the crankset 114 of FIG. 2. FIGS. 15A-15C again include a representation of the straight chainline 1400 as a reference. In the example shown in FIGS. 15A-15C, the chainring 300 is connected to the tenth-largest or tenth sprocket 119 via the chain 116. FIGS. 15A-15C illustrate a fourth tilt angle α of the chainring assembly 202 about the pivot axis 344 relative to the straight chainline 1400. As the first crank arm 204 is rotated about the crank axis 214, the fourth tilt angle α is maintained with aid of the detent mechanism 360 (see FIG. 3).

The disclosed crankset and, more specifically, chainring assembly may be particularly well suited for use on lightweight road bicycles or mountain bicycles. However, the chainring assembly may also be used on other at least partially human-powered vehicles such as on off-road bicycles, road bicycles, and electric motor assisted bikes.

The illustrations of the embodiments and examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of ordinary skill in the art upon reviewing the disclosure. Other embodiments may be utilized and derived from the disclosure, such that structural and logical substitutions and changes may be made without departing from the scope of the disclosure. Additionally, the illustrations are merely representational and may or may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the inventions or of what may be claimed, but rather as descriptions of features specific to particular embodiments of the inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A carrier for a chainring of a bicycle, the carrier comprising:
   a chainring attachment portion;
   a crank assembly attachment portion, the chainring attachment portion and the crank assembly attachment portion configured to rotate about a crank axis and transmit torque between the crank assembly attachment portion and the chainring attachment portion; and
   a pivot attachment portion having a pivot axis disposed a distance from the crank axis, the chainring attachment portion and the crank assembly attachment portion configured to rotate about the pivot axis and the crank axis.

2. The carrier of claim 1, wherein the pivot attachment portion does not rotate about the crank axis.

3. The carrier of claim 2, further comprising a friction reducing device disposed between the pivot attachment portion and the chainring attachment portion, the friction reducing device reducing friction of rotational motion therebetween.

4. The carrier of claim 3, wherein the friction reducing device is an annular bearing having an inner race and an outer race.

5. The carrier of claim 4, wherein the inner race of the annular bearing is rotationally fixed relative to the pivot attachment portion.

6. The carrier of claim 5, wherein the pivot attachment portion is formed as part of the inner race of the annular bearing.

7. The carrier of claim 6, wherein the pivot attachment portion and the inner race of the annular bearing are formed as an integral single piece structure.

8. The carrier of claim 1, wherein the pivot axis is perpendicular to the crank axis.

9. The carrier of claim 1, wherein the pivot axis is disposed a distance farther from a rear wheel axis of the bicycle than the crank axis is disposed from the rear wheel axis.

10. The carrier of claim 1, wherein the crank assembly attachment portion is configured for attachment to a crank arm of a crank assembly.

11. The carrier of claim 10, wherein the crank assembly attachment portion includes a sliding surface, the sliding surface being configured to slidably attach the carrier to a corresponding feature of the crank arm.

12. The carrier of claim 11, wherein the sliding surface is disposed a radial distance from the crank axis.

13. The carrier of claim 1, further comprising a rotation resistance device configured to resist the rotation of the carrier about the pivot axis.

14. The carrier of claim 13, wherein the rotation resistance device comprises a detent mechanism.

15. The carrier of claim 14, wherein the detent mechanism comprises a plurality of preset detent positions corresponding to a plurality of pivot positions of the carrier about the pivot axis.

16. A crankset for a bicycle, the crankset comprising:
    a crank assembly including a first crank arm, a second crank arm, and a crankshaft connecting the first crank arm and the second crank arm when the crankset is assembled; and
    a chainring assembly including:
      a chainring including a plurality of teeth disposed about a periphery of a body of the chainring, the chainring having an opening through which the crankshaft extends, the chainring configured to rotate about a crank axis;
      a carrier including a pivot having a pivot axis, the chainring being rotatably attached to the carrier about the crank axis such that the chainring is also configured to rotate about the pivot axis,
    wherein the pivot axis is at a distance removed from the crank axis.

17. The crankset of claim 16, wherein the pivot axis is disposed perpendicular relative to the crank axis.

18. The crankset of claim 16, wherein the carrier further includes an annular bearing, the annular bearing including an inner race and an outer race,
    wherein the chainring includes a connection region radially inner of the plurality of teeth,
    wherein the carrier further includes:
      a radially outer connection portion fixably connected to the outer race, the radially outer connection portion configured to mount to the connection region of the chainring; and
      a radially inner pivot mounting portion fixably attached to the inner race, the radially inner pivot mounting portion configured to attach to a rotatably fixed portion of the bicycle and rotate about the pivot axis.

19. The crankset of claim 18, wherein the radially inner pivot mounting portion includes a ring having an outer annular surface that is connected to the inner race of the annular bearing, and
    wherein the radially inner pivot mounting portion is tiltable relative to the rotatably fixed portion of the bicycle about the pivot axis.

20. The crankset of claim 19, wherein the pivot includes a pin that couples the radially inner pivot mounting portion with the rotatably fixed portion of the bicycle, the pin extending through openings through the rotatably fixed portion of the bicycle and the radially inner pivot mounting portion, respectively, and defining the pivot axis.

21. The crankset of claim 19, wherein the crankshaft extends through the rotatably fixed portion of the bicycle and is rotatable relative to the rotatably fixed portion of the bicycle.

22. The crankset of claim 19, wherein the radially inner pivot mounting portion includes a rotational resistance device extending radially inward of an inner surface of the radially inner pivot mounting portion, and
> wherein the rotatably fixed portion of the bicycle includes at least one outer wall, the at least one outer wall interacting with the rotational resistance device to resist rotation of the carrier about the pivot axis.

23. The crankset of claim 22, wherein the at least one outer wall of the rotatably fixed portion of the bicycle interacts with the rotational resistance device so as to be positionable between a plurality of detent positions, each of the plurality of detent positions corresponding to a different tilt angle of the carrier and the chainring relative to the rotatably fixed portion of the bicycle.

24. The crankset of claim 23, wherein the rotational resistance device is a detent device.

25. The crankset of claim 16, wherein the first crank arm is connected to and drives the carrier at a radial distance removed from a radially outer surface of the crankshaft.

26. The crankset of claim 25, wherein the first crank arm is connected to the carrier with a linear motion bearing.

27. A chainring assembly for a bicycle, the chain ring assembly comprising:
> a chainring including a plurality of teeth disposed about a periphery of a body of the chainring, the chainring configured to rotate about a crank axis;
> a carrier including:
>> a chainring attachment portion;
>> a crank assembly attachment portion, the chainring attachment portion and the crank assembly attachment portion configured to rotate about the crank axis and transmit torque between the crank assembly attachment portion and the chainring attachment portion; and
>
> a pivot attachment portion having a pivot axis disposed a distance from the crank axis, the chainring attachment portion and the crank assembly attachment portion configured to rotate about the pivot axis and the crank axis.

* * * * *